United States Patent
Yi et al.

(10) Patent No.: US 11,804,942 B2
(45) Date of Patent: **\*Oct. 31, 2023**

(54) COMMUNICATION METHOD USING NR FOR 5G

(71) Applicant: LG ELECTRONICS INC., Seoul (KR)

(72) Inventors: Yunjung Yi, Seoul (KR); Byounghoon Kim, Seoul (KR); Kijun Kim, Seoul (KR); Kyuseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/735,814

(22) Filed: May 3, 2022

(65) Prior Publication Data

US 2022/0271905 A1    Aug. 25, 2022

Related U.S. Application Data

(63) Continuation of application No. 16/064,767, filed as application No. PCT/KR2017/005954 on Jun. 8, 2017, now Pat. No. 11,349,627.

(Continued)

(51) Int. Cl.
*H04W 4/00* (2018.01)
*H04L 5/00* (2006.01)
(Continued)

(52) U.S. Cl.
CPC .......... *H04L 5/0094* (2013.01); *H04L 1/1642* (2013.01); *H04L 5/0082* (2013.01); *H04L 27/2607* (2013.01); *H04W 72/0446* (2013.01)

(58) Field of Classification Search
CPC ... H04L 5/0094; H04L 1/1642; H04L 5/0082; H04L 27/2607; H04L 27/26025;
(Continued)

(56) References Cited

U.S. PATENT DOCUMENTS 11,349,627 B2 *   5/2022  Yi ........................... H04L 5/143
2011/0032850 A1   2/2011  Cai
(Continued)

FOREIGN PATENT DOCUMENTS

EP    3823341 A1 *   5/2021  ........... H04L 1/1812
EP    3923646 A1 * 12/2021  ......... H04L 27/2602
(Continued)

OTHER PUBLICATIONS

LG Electronics, "Support different numerology and different usage scenarios," 3GPP TSG RAN WG1 Meeting #85, R1-164561, May 23-27, 2016, 8 pages.
(Continued)

*Primary Examiner* — Thai D Hoang
(74) *Attorney, Agent, or Firm* — Fish & Richardson P.C

(57) ABSTRACT

The disclosure of the present invention proposes a wireless communication method. The method may comprise: performing a downlink (DL) reception on a DL resource; and performing an uplink (UL) transmission on a UL resource. The UL resource and the DL resource may use different numerologies each other. The numerologies may be defined by a subcarrier spacing and a cyclic prefix (CP) length.

12 Claims, 26 Drawing Sheets

Related U.S. Application Data

(60) Provisional application No. 62/444,393, filed on Jan. 10, 2017, provisional application No. 62/404,769, filed on Oct. 6, 2016, provisional application No. 62/401,877, filed on Sep. 29, 2016, provisional application No. 62/380,365, filed on Aug. 27, 2016, provisional application No. 62/378,654, filed on Aug. 23, 2016, provisional application No. 62/347,598, filed on Jun. 8, 2016.

(51) Int. Cl.
 H04L 1/1607 (2023.01)
 H04L 27/26 (2006.01)
 H04W 72/0446 (2023.01)

(58) Field of Classification Search
 CPC ....... H04L 5/001; H04L 5/0064; H04L 5/143; H04L 1/1887; H04L 1/18; H04L 5/1469; H04L 1/1812; H04L 27/2666; H04L 27/2678; H04W 72/0446
 See application file for complete search history.

(56) References Cited

U.S. PATENT DOCUMENTS

| | | |
|---|---|---|
| 2011/0103406 A1 | 5/2011 | Cai |
| 2016/0105863 A1 | 4/2016 | Li |
| 2021/0127450 A1* | 4/2021 | Abdoli .................. H04W 76/27 |

FOREIGN PATENT DOCUMENTS

| | | | | |
|---|---|---|---|---|
| KR | 101604684 | | 3/2016 | |
| WO | WO-2016206763 A1 | * | 12/2016 | ........... H04L 5/0007 |
| WO | WO-2016209139 A1 | * | 12/2016 | ............. H04L 27/02 |
| WO | WO-2017005331 A1 | * | 1/2017 | ......... H04L 27/0008 |

OTHER PUBLICATIONS

Qualcomm Incorporated, "Numerology and TTI multiplexing for NR Forward Compatibility Analysis", R1-164692, 3GPP TSG-RAN WG1 #85, Nanjing, China, May 23-27, 2016, 8 pages.

Qualcomm Incorporated, "Summary of email discussion on frame structure," R1-165456, 3GPP TSG-RAN WG1 #85, Nanjing, China, May 23-27, 2016, 28 pages.

Samsung, "Discussion on the base subcarrier spacing for NR," 3GPP TSG RAN WG1 #85, R1-163996, May 23-27, 2016, 5 pages.

Verizon Wireless et al., "WF on subcarrier spacing in NR," R1-165734, 3GPP RAN1#85, Agengda: 7.1.4, Nanjing, China, May 23-27, 2016, 17 pages.

ZTE, ZTE Microelectronics, "Overview of numerology candidates", R1-164271, 3GPP TSG RAN WG1 Meeting #85, Nanjing, China, May 23-27, 2016, 7 pages.

* cited by examiner

Symbol level alignment option 1

Symbol level alignment option 2

Symbol level alignment option 2-1

(a) Slot/subframe level alignment multiplexing examples

FIG. 8
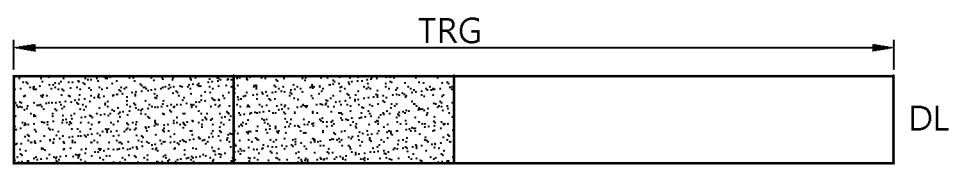
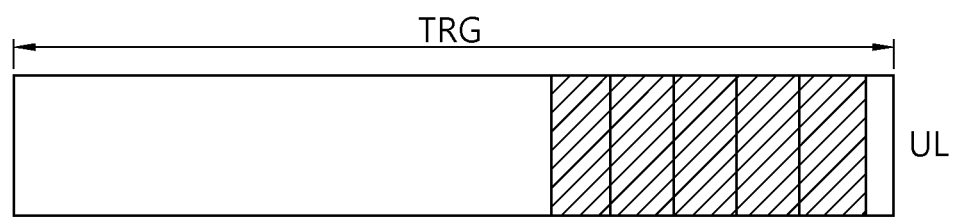

DM-RS transmission for
multiple mini-SF or measurement RS

COMMUNICATION METHOD USING NR FOR 5G

CROSS-REFERENCE TO RELATED APPLICATIONS

This application is a continuation of U.S. application Ser. No. 16/064,767, filed on Jun. 21, 2018, which is a National Stage application under 35 U.S.C. § 371 of International Application No. PCT/KR2017/005954, filed on Jun. 8, 2017, which claims the benefit of U.S. Provisional Application No. 62/444,393, filed on Jan. 10, 2017, U.S. Provisional Application No. 62/404,769, filed on Oct. 6, 2016, U.S. Provisional Application No. 62/401,877, filed on Sep. 29, 2016, U.S. Provisional Application No. 62/380,365, filed on Aug. 27, 2016, U.S. Provisional Application No. 62/378,654, filed on Aug. 23, 2016, and U.S. Provisional Application No. 62/347,598, filed on Jun. 8, 2016. The disclosures of the prior applications are hereby incorporated by reference herein in their entirety.

BACKGROUND OF THE INVENTION

Field of the Invention

The present invention relates to mobile communication.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (RAT) for convenience. The new RAT may be also abbreviated to a NR.

For operating NR efficiently, various schemes have to be adopted. However, until now, efficient scheme has not been introduced.

SUMMARY OF THE INVENTION

Accordingly, the disclosure of the specification has been made in an effort to solve the problem.

To achieve the foregoing purposes, the disclosure of the present invention proposes a wireless communication method. The method may comprise: performing a downlink (DL) reception on a DL resource; and performing an uplink (UL) transmission on a UL resource. The UL resource and the DL resource may use different numerologies each other. The numerologies may be defined by a subcarrier spacing and a cyclic prefix (CP) length.

Between the DL subframe and the UL subframe there may exist a gap period.

The gap period may be defined based on the numerology for UL resource or DL resource. As there can be DL and UL resource in a slot, the definition of slot is defined by the larger subcarrier spacing between subcarrier spacing used for DL and UL respectively.

If plural numerologies is supported, a largest or smallest subcarrier spacing may be configured as a reference subcarrier spacing.

The DL or UL subframe may include a plurality of orthogonal symbols, and the CP length may be scaled up or down to align a level of the orthogonal symbol among different numerologies.

The DL resource and the UL resource may be included in a transmission time interval (TTI). Here, the TTI further includes a special resource other than the DL resource and the UL resource.

To achieve the foregoing purposes, the disclosure of the present invention proposes a wireless device. The wireless device may comprise: a transceiver; and a processor configured to control the transceiver thereby: performing a downlink (DL) reception on a DL resource; and performing an uplink (UL) transmission on a UL resource. The UL resource and the DL resource may use different numerologies each other. The numerologies may be defined by a subcarrier spacing and a cyclic prefix (CP) length.

According to the disclosure of the present specification, the problems of the above-described prior art are solved.

BRIEF DESCRIPTION OF THE DRAWINGS

FIGS. 7 and 8 illustrates an example of TRG.

DESCRIPTION OF EXEMPLARY EMBODIMENTS

Figure 1:
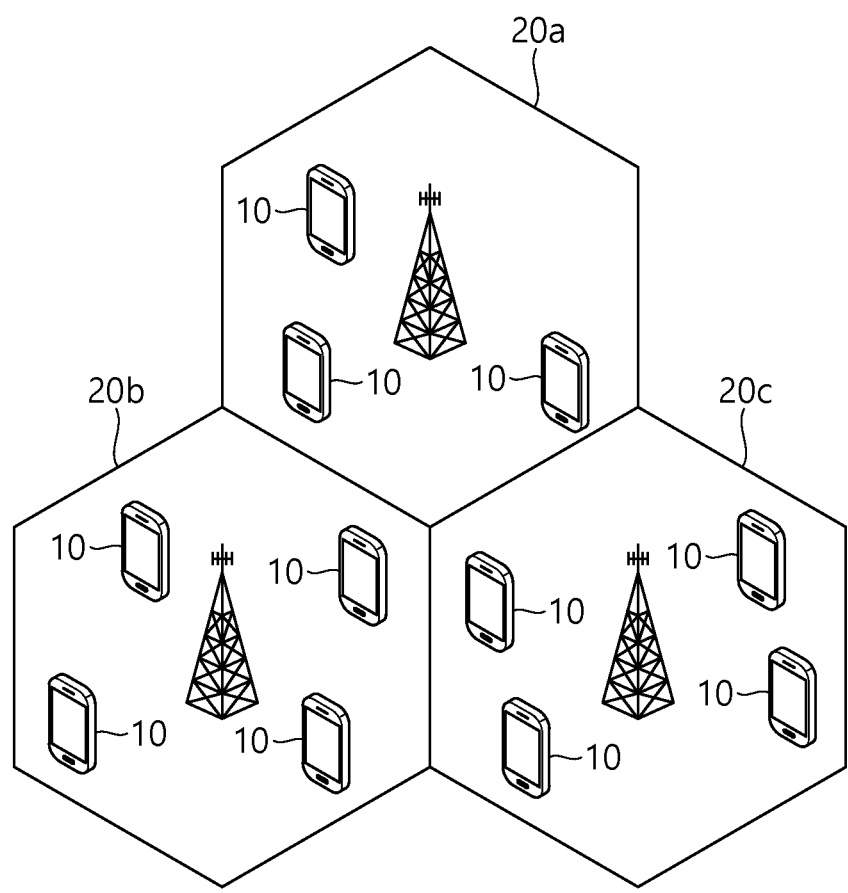
FIG. 1 illustrates a wireless communication system.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'wireless device' may be stationary or mobile, and may be denoted by other terms such as terminal, MT (mobile terminal), UE (user equipment), ME (mobile equipment), MS (mobile station), UT (user terminal), SS (subscriber station), handheld device, or AT (access terminal).

As used herein, 'base station' generally refers to a fixed station that communicates with a wireless device and may be denoted by other terms such as eNB (evolved-NodeB), BTS (base transceiver system), or access point.

Hereinafter, applications of the present invention based on 3GPP (3rd generation partnership project) LTE (long term evolution) or 3GPP LTE-A (advanced) are described. However, this is merely an example, and the present invention may apply to various wireless communication systems. Hereinafter, LTE includes LTE and/or LTE-A.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Figure 2:
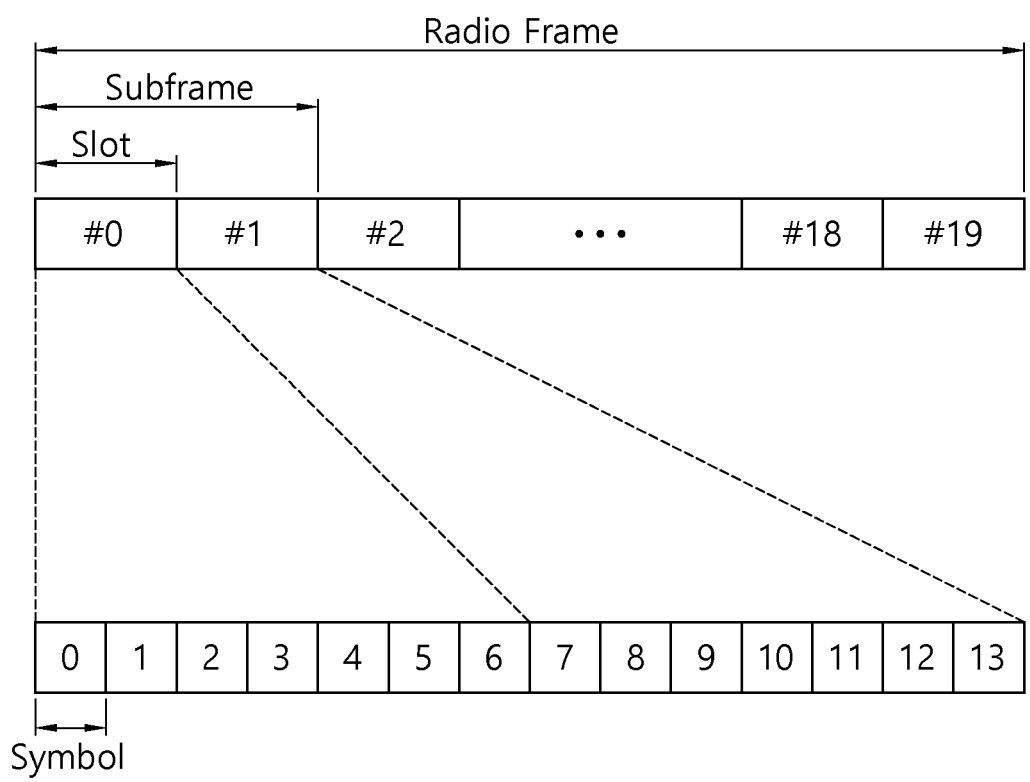
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame includes 10 subframes indexed 0 to 9. One subframe includes two consecutive slots. Accordingly, the radio frame includes 20 slots. The time taken for one subframe to be transmitted is called a transmission time interval (TTI). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

As such, one subframe is called as a transmission-time-interval (TTI). TTI refers to the duration of a transmission. So, the base station schedule the radio resource in unit of the TTI, e.g., subframe.

<Carrier Aggregation>

Hereinafter, a carrier aggregation (CA) system will be described.

The CA system refers to aggregate a plurality of component carriers (CCs). Due to CA, the meaning of a legacy cell has been changed. According to CA, a cell may refer to a combination of a downlink (DL) CC and an uplink (UL) CC or a single DL CC.

Also, in CA, a cell may be classified as a primary cell, a secondary cell, and a serving cell. The primary cell refers to a cell operating in a primary frequency and refers to a cell in which a UE performs an initial connection establishment procedure or a connection re-establishment procedure with a BS (or an eNB) or a cell indicated as a primary cell during a handover procedure. The secondary cell refers to a cell operating in a secondary frequency, which is configured once RRC connection is established and which is used to provide additional wireless resource.

As mentioned above, in the CC system, a plurality of CCs, i.e., a plurality of serving cells, may be supported, unlike a single carrier system.

Such carrier aggregation system may support cross-carrier scheduling. The cross-carrier scheduling is a scheduling scheme that may conduct resource allocation of a physical uplink shared channel (PUSCH) transmitted through other component carriers than the component carrier basically linked to a specific component carrier and/or resource allocation of a physical downlink shared channel (PDSCH) transmitted through other component carriers through a physical downlink control channel (PDCCH) transmitted through the specific component carrier.

<Next Generation Mobile Network>

5th generation mobile networks or 5th generation wireless systems, abbreviated 5G, are the proposed next telecommunications standards beyond the current 4G LTE/international mobile telecommunications (IMT)-advanced standards. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things. Hereinafter, 5G technology may be referred to as new radio access technology (NR).

In NR, utilizing a subframe in which downlink and uplink are contained may be considered. This scheme may be applied for paired spectrum and unpaired spectrum. The paired spectrum means that one carrier consists of two parts of spectrum for downlink and uplink operation. For example, in the paired spectrum, the one carrier may include a DL carrier and an UL carrier, which are paired with each other. In the paired spectrum, communication, such as DL, UL, device-to-device communication, and/or relay communication, may be performed by utilizing the paired spectrum. The unpaired spectrum means that that one carrier consists of only one carrier, like the current 4G LTE. In the unpaired spectrum, communication, such as DL, UL, device-to-device communication, and/or relay communication, may be performed in the unpaired spectrum.

Further in new RAT, the following subframe types may be considered to support the paired spectrum and the unpaired spectrum mentioned above.

(1) Subframes including DL control and DL data (2) Subframes including DL control, DL data, and UL control (3) Subframes including DL control and UL data (4) Subframes including DL control, UL data, and UL control (5) Subframes including access signals or random access signals or other purposes.

(6) Subframes including both DL/UL and all UL signals.

However, the subframe types listed above are only exemplary, and other subframe types may also be considered.

Figure 3:
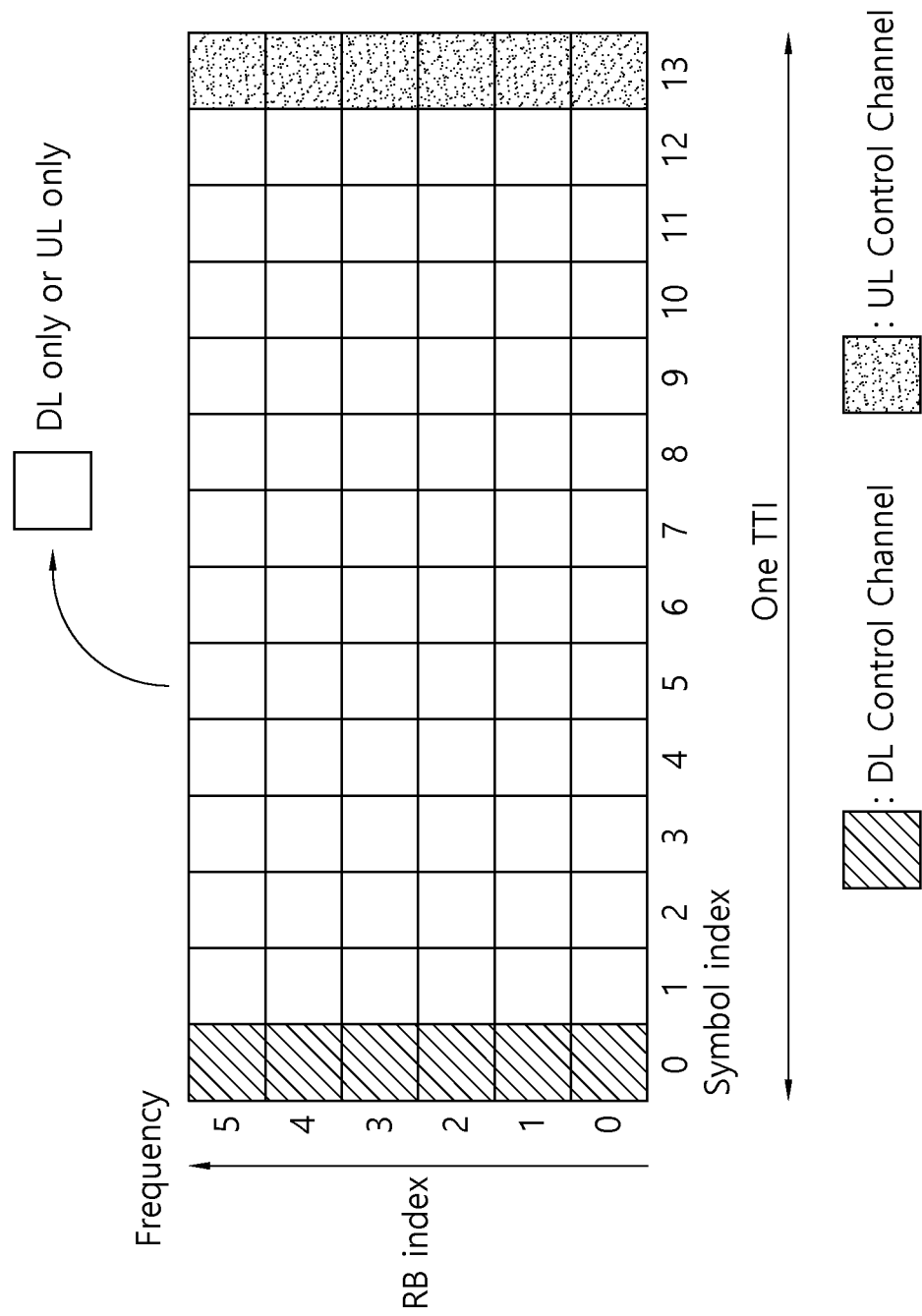
FIG. 3 shows an example of subframe or slot for new RAT.

FIG. 3 shows an example of subframe or slot for new RAT.

As shown in FIG. 3, the one TTI is called as a subframe or slot for new RAT. The subframe or slot shown in FIG. 3 may be used in TDD system of new RAT, in order to minimize latency of data transmission. Referring to FIG. 3, the subframe (or slot) contains 14 symbols in one TTI, like the current subframe. However, the subframe (or slot) includes DL control channel in the first symbol, and UL control channel in the last symbol. The remaining symbols may be used for DL data transmission or for UL data transmission. According to this subframe (or slot) structure, DL transmission and UL transmission may sequentially proceed in one subframe (or slot). Accordingly, DL data may be transmitted in the subframe (or slot), and UL acknowledgement/non-acknowledgement (ACK/NACK) may also be received in the subframe (or slot). In this manner, the subframe (or slot) shown in FIG. 3 may be referred to as self-contained subframe. As a result, it may take less time to retransmit data when a data transmission error occurs, thereby minimizing the latency of final data transmission. In the self-contained subframe (or slot) structure, a time gap may be required for the transition process from the transmission mode to the reception mode or from the reception mode to the transmission mode. For this purpose, some OFDM symbols at the time of switching from DL to UL in the subframe (or slot) structure may be set to the guard period (GP).

Figure 4A:
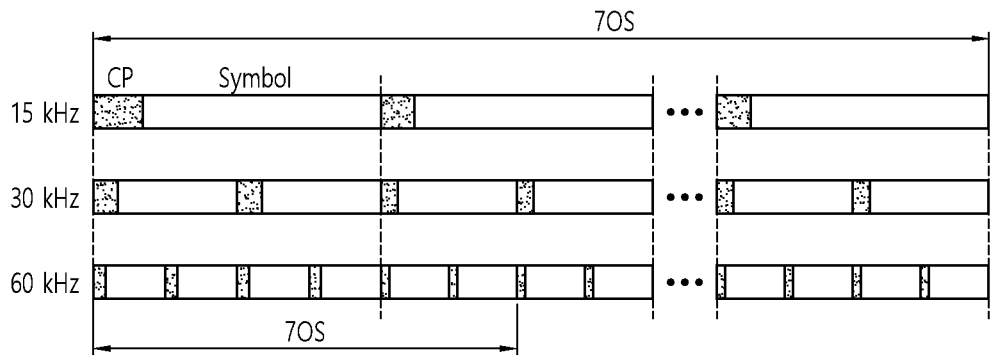
FIGS. 4A through 4C show examples of symbol level alignment.
Figure 4B:
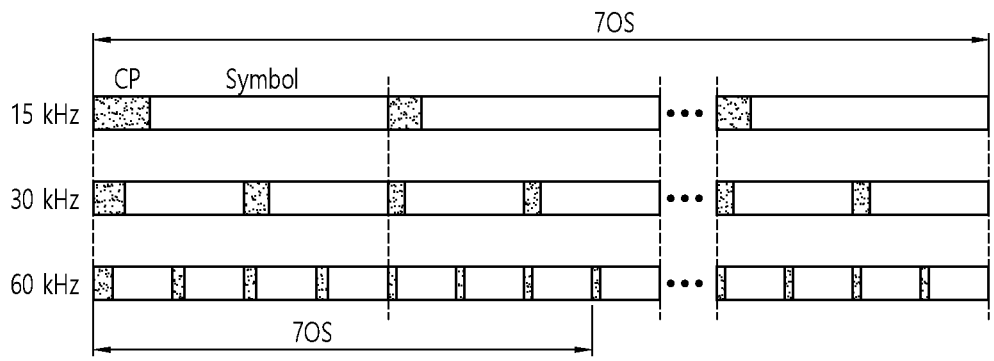
Figure 4C:
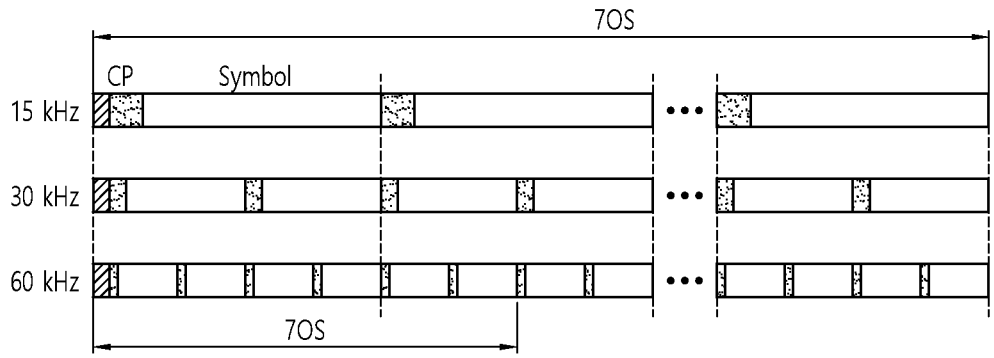
Figure 5:
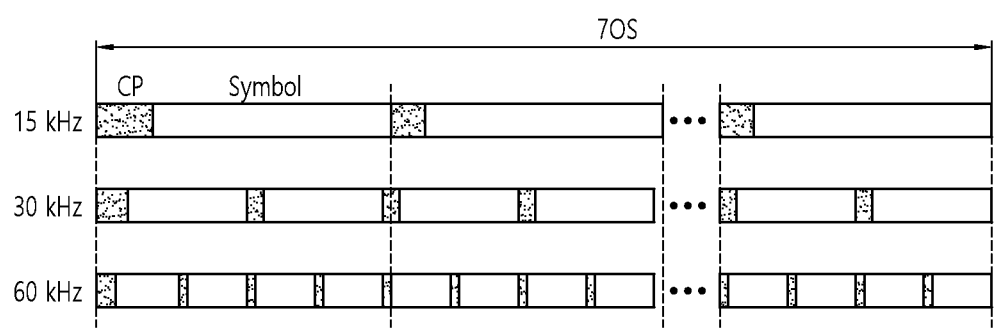
FIG. 5 shows an example of slot/subframe level alignment.

FIGS. 4A through 4C shows examples of symbol level alignment and FIG. 5 shows an example of slot/subframe level alignment.

For normal CP family, choose one option from the followings for symbol-level alignment.

For $F_s = F_0 * 2^n$ (n is a positive integer, $F_0 = 15$ kHz).

Each symbol length (including CP) of $F_0$ equals the sum of the corresponding $2^n$ symbols of $F_s$.

Option 1: The first $2^n$ symbols of $F_s$ have equal symbol length

Option 2: Except for the first symbol of $F_s$, all symbols of $F_s$ have equal symbol length. The length of first symbol of $F_s$ is sum of length of the second symbol and 0.51 us Option 2-1. 0.51 us can be reserved, and all symbols have the equal length Disclosures of the Invention I. First Disclosure I-1. Flexible Resource Unit In next generation network, it is expected that various usage scenarios requiring different latency and reliability KPIs are supported in the same frequency region potentially by the same cell. Furthermore, to allow growing vertical industry and potentials needs (yet unknown) in the future, frame structure should be able to support very flexible resource utilizations. One of flexible resource utilization aspects includes supporting various set of CP overhead compared to OFDM symbol size. Some requirements can be listed as follows.

Resource unit means a transmission time interval (TTI). Accordingly, the resource unit may be called as a subframe or a slot. Resource unit (e.g., subframe) can include variable number of mini resource units. It is expected that different latency requiring usage scenarios would be multiplexed, thus, ability to allow different resource unit sizes seems necessary. When mini resource unit is also used, basic functions to generate channels can be based on min-resource unit rather than resource unit. Basic function includes functionalities such as control/data scrambling, contain RS, scheduling, etc. This can be also used for inter-cell interference coordination. The mini-resource unit or resource unit size can be different per UE or usage scenario or per subband/narrowband.

From a UE perspective, scheduling unit or resource block used in "one" transmission can vary depending on latency requirement and packet size, etc. Also, the timing relationship among channels (such as PDSCH and corresponding A/N, UL grant to PUSCH, SPS configuration periodicity, etc) can be different per UE/usage scenario/subband.

From a UE perspective, mechanism to maximize spectral efficiency for example by reducing CP or GP is supported. One of extreme mechanism is to transmit "multiple set of (CP size, OFDM symbol size)" where a UE can select the best pair based on the measurement, and report it back to the network such that the selected pair can be used for the given UEs. For example, under 6 GHz frequency, there could be {NCP, 15 kHz}, {ECP, 30 kHz}, {NCP, 30 kHz}, {NCP, 60 kHz} possibilities which can be sent via measurement RS or signals such that a UE can measure the performance and report the best pair. This may be done also via initial access procedure (e.g., RAR or Msg 4 is sent with multiple combinations and the UE selects the best pair based on received RAR or Msg 4 quality) for numerology selection for downlink. Similarly, for UE, multiple msg3 with different numerologies may be sent or SRS with different numerology may be sent for determining numerology for uplink. Based on SINR and delay spread, it can be also estimated. In terms of GP, it is much easier that the network may assume "no GP" for a given UE initially, and set "GP" based on UE capability or requesting GP length. The UE can ask "margin" in addition to timing advance on GP requirement which may be necessary for transient period or DL/UL switching. As timing advance can be also increased, GP length can be dynamically adjusted which can be done via higher layer signaling or changed autonomously with timing advance.

Network should be able to "blank" partial or full resource unit in both time and frequency domain For example, very short and infrequent message interruption may be necessary to convey emergency messages or extremely urgent message delivery.

The proposed "special" OFDM symbol in this invention can be also used for "blank" resource for future proof Thus, basic mechanism of assuming that one resource unit defined in a time duration can be always usable by the network either to downlink or uplink may not work. It should be supported to provide reserved partial resources which may not be used for some UE's downlink/uplink even in one resource unit.

Furthermore, different UEs are multiplexed where different UEs may require different CP length due to its environments.

Based on the above observations, this invention proposes "flexible" resource unit definition which allows Different number of OFDM symbols in a resource unit Effective OFDM symbols usable for downlink or uplink or sidelink may be restricted Various pattern of special resource or reserved resource can be configurable Note that "special resource" referred here means that the resource may not be used or a UE may not assume downlink or uplink (or possibly sidelink) for regular TTI definition, rather it can be used for some other purposes such as control and/or pilot RS transmission. It is however noted that this "special resource" can be also used by the UE with dynamic scheduling.

Different size of resource unit can change over time and frequency, and different size of resource units can be multiplexed in FDM and TDM manner from the network operation perspective. If the network and/or UE can support, overlapping between resource units of different sizes can be also supported.

For a convenience, there is two aspects to define resource units in frequency domain and time domain. From frequency domain, we can call a set of contiguous subcarriers which utilizing the same numerology as "frequency resource group" (FRG), and from time-domain we can call a set of "OFDM symbols" which utilizing the same numerology as "time resource group (TRG)". A numerology resource unit is defined as a set of FRG and TRG with a numerology set {subcarrier spacing, cycle prefix (CP) duration(s)}. This invention mainly discusses "TRG" construction, which can be applied to a numerology (hereinafter referred to as NRG). FRG can be contiguous or non-contiguous. In case contiguous, there could be multiple FRGs sharing the same numerology in a carrier. In case non-contiguous, only one FRG in a NR carrier uses the same numerology.

In case TRG is defined, there could be multiple of TRGs possible where the same numerology is assumed to be used. Let's call this as "G-TRG" (group-TRG).

G-TRG can be larger than 1 msec or subframe length of a given numerology or a reference numerology set. In any case, from a UE perspective on a given usage scenario, for a given NRG, the UE may assume that the same numerology is used in the NRG unit. This can be also used for inter-cell interference coordination, for example, one a given frequency chunk, the network may change its numerology at subframe or a time scale of G-TRG which can be either prefixed or configured (which can be also coordinated among inter cells). One example is to allow coordination with LTE numerology where at least the same numerology is used within 1 msec or the numerology may change at time-scale of "T" (where G-TRG size is T) to avoid unnecessarily fluctuating interference. In other words, this time and frequency units can be negotiated/coordinated among neighbour cells such that each cell can manage its own scheduling/handling of interference accordingly. If there are multiple NRGs, it is also possible that multiple signalling of time and frequency granularity with numerology set can be coordinated.

From a UE cancellation perspective, it can be also known to the UE that the duration where one numerology can be maintained in a time T (G-TRG) regardless of whether the service is intended for the UE or not. During the time, a UE can assume the signals would be generated based on the configured numerology. It is however noted that this can be only used as "baseline" signalling where some other numerology based generated signals can puncture the baseline signals. One example is that a network may configure a frequency range with 15 kHz and normal CP for a radio frame unit, and then 30 kHz URLLC traffic may puncture occasionally the baseline 15 kHz signals.

This G-TRG unit can be also used for signalling purpose where a UE may be configured dynamically with a numerology set which will be used in the next G-TRG/FRG. In time and/or frequency RG indication can be possible.

So, at least from ICIC perspective or UE cancellation perspective, basic unit to retain the same numerology can be necessary in addition to the frequency information.

It is also however possible that multiple levels of G-TRGs can be defined with the same numerology set in the same frequency region or FRG such that one may be semi-statically configured, which can be dynamically overridden by dynamic change. For example, semi-statically, G-TRG can be configured in multiple of radio-frames, which can be overridden by dynamic signalling per each subframe. One easy example of G-TRG is a radio frame where as TRG is a subframe. For UL and DL, G-TRG and TRG can be independently configured from a numerology perspective.

Figure 6:
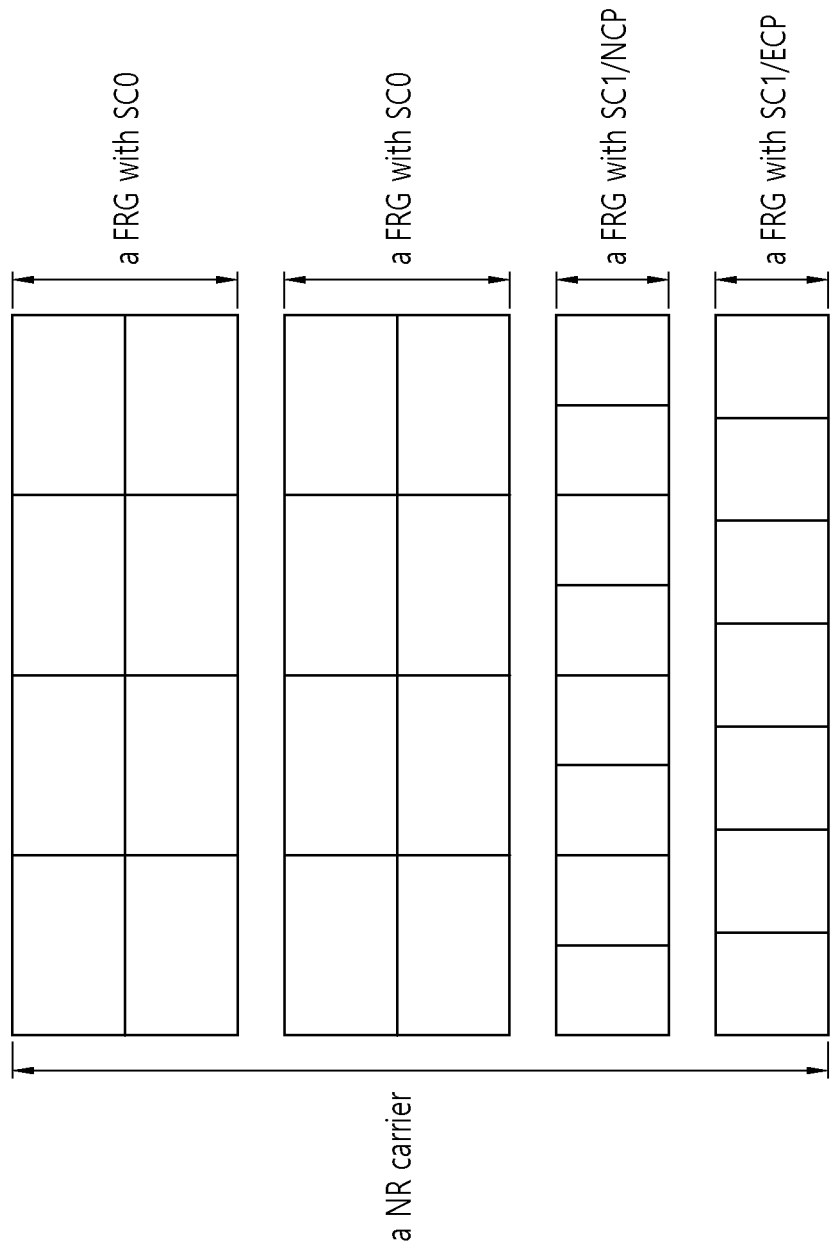
FIG. 6 illustrates an example of FRG.
Figure 7:
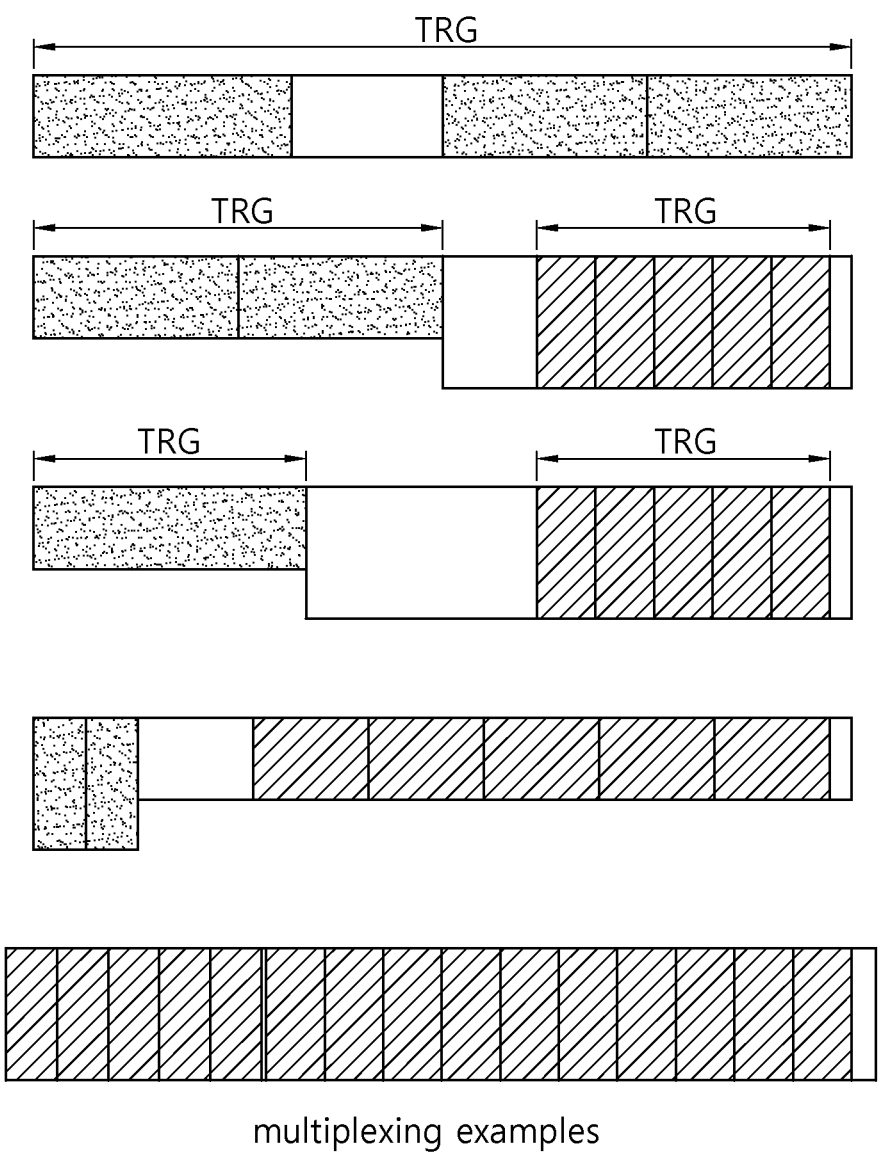

In general, to operate in unpaired spectrum,
  Semi-static UL/DL configuration can be given per subframe
  TRG in unit of subframe per DL and UL can be configured
  G-TRG in unit of TRG per DL and UL can be configured
  G-FRG (group of FRG) per each numerology can be configured (baseline FRG or a carrier)
  Dynamic frequency region change indication used with each numerology FIG. 6 illustrates an example of FRG and FIGS. 7 and 8 illustrates an example of TRG.

FRGs can be overlapped or overlaid. For example, a network may consist of two overlaid resource blocks with two different numerologies. One example of overlaid resource block is MBSFN subframe in LTE where one FRG consists of a carrier bandwidth with 15 kHz and normal CP. Another FRG consist of a carrier bandwidth with 15 kHz (or 7.5 kHz or other numerology used for MBMS) and extended CP. In terms of TRG of the second FRG would be "12 OFDM symbols" excluding the first two OFDM symbols or a region configured as MBMS region. If a carrier can be divided into a few numerology regions, there could be multiple FRGs in a carrier. A guard band may be considered as "non-numerology" defined region.

Note that this TRG can be also used with DL burst or UL burst or DL or UL respectively. In other words, TRG can be a subframe or DL burst or UL burst. Alternatively, TRG can be considered as "subframe or slot" where two TRGs can be overlaid—one for DL and the other for UL. This is aligned with subframe definition. The numerology in GP or a region not used for DL or UL part (from a UE's resource assumption perspective) is considered as "non-numerology defined region: as shown in FIG. 8.

In this case, non-numerology region (or GAP) is used in TRG. Some of FRG may be defined as a carrier if they are not changed over time. FRG may only cover the case where FRG region may change over time. In this case, another approach to define FRG is to define the superset of frequency resource region which can be used with one numerology set, and the unused frequency region in each time may be considered as "non-numerology" defined region, which still is covered by the FRG. For example, one simple approach is to define a carrier as a set of "overlaid" NRGs where each NRG is {numerology set, a system bandwidth}. There could be different NRGs defined per UE capability and/or usage scenarios. Per each FRG, synchronization signal is assumed to be present in this case. However, it is also noted that some FRG may share the same sync from one FRG.

More specifically, semi-static guard band may be not be included in FRG. FRG can have "non-numerology defined" or temporary unusable resource due to reserved resource or due to guard to support various dynamic operation, and data-transmittable portion.

A carrier: this can be defined as "start" and "end" of frequency which will be used/allocated semi-statically. Generally, a carrier is assumed to be carried with synchronization signals, unless the carrier is dependent on another carrier's for synchronization purpose. A carrier is defined with "reference numerology set" which can be used for synchronization purpose at least.
  Within a carrier, multiple NRGs can be defined which can be used with different numerologies from the reference numerology, at least in terms of data/control transmission (and potentially RS). Each NRG may or may not have synchronization signals.
  If dynamic numerology changes is supported, multiple NRGs may be overlaid/overlapped in frequency/time domain.
  One example is that a UE is initialized/associated with a cell with SC0 where a UE is reconfigured with SC1. In this case, NRG of SC0, and NRG of SC1 are both supported by the UE depending on the numerology it is using. NRG of SC0 and NRG of SC1 may or may not overlap.
  Another definition is to define "a continuous frequency resources" as a carrier where a UE discovers through initial access procedure. Within a carrier, multiple numerology with different NRGs can be overlapped. Example is to access the cell via 15 kHz, and URLLC services can be configured to frequency region of F1 where different numerology may be used. Another example is to divide frequency region in to one eMBB carrier and multiple NB-IoT carriers, and within one eMBB carrier, some mixed numerologies can be supported.
  Depending on whether each usage service is supported in inband each other or stand-alone, the relationship between FRG and carrier can be different. Let's say, BW1 for mMTC, BW2 for eMBB, and BW3 for URLLC, where the total system bandwidth is BW. In case two carriers of BW1+BW2=BW in stand-alone operation of mMTC, there could be two carriers. In case mMTC carrier can hop in different frequency region in BW, it is easier to define BW as a carrier, and define FRG of mMTC and FRG of mMBB and FRG of URLCC within the BW. In this case, there is only one carrier with three different NRGs.

More specifically, FRG can
Change its center frequency
Change its width dynamically
Will be defined by numerology
Where as a carrier
With semi-static center frequency
Its own synchronization signals
May be independent on numerology (it is considered as "frequency chunk")

This invention discusses how to define a resource unit size which can be defined as {P subcarriers, Q OFDM symbols} in a set of {Numerology, FRG, TRG}. One set of {Numerology, FRG, TRG} in LTE is {15 kHz, NCP, a system bandwidth, subframe}, and another set is {15 kHz, ECP, a system bandwidth} in LTE.

In case strict FDM is used between 15, 30, 60 kHz NCP, with BW1, BW2, and BW3 respectively, a NR carrier has
{15 kHz, NCP, BW1, 1 msec}
{30 kHz, NCP, BW2, 1 msec}
{30 kHz, NCP, BW3, 1 msec}

In terms of defining "TRG", basic unit can be either based on a reference subcarrier spacing or numerology based subframe (i.e., K orthogonal symbols (OSs) with the reference numerology set) (note that reference subcarrier spacing in this invention or other inventions can be replaced with reference numerology set), or based on subframe (consisting of K OS switch the given numerology). The reference subcarrier spacing can be larger subcarrier spacing or smaller subcarrier between subcarrier spacing used for DL and UL.

In case DL and UL uses different numerology sets, two different NRG can be constructed per each DL and UL even though they are in the same frequency range.

In case DL and UL uses different FRG, each NRG defines for each DL and UL respectively. Generally, it can be considered to define independent NRG for UL and DL respectively.

For a NRG, a basic resource unit (BRU) is defined where the NRG consists of a set of BRUs. One example of BU is RB in LTE. There are two RB definitions in LTE with normal CP (7 OS) and extended CP (6 OS). Similarly, for each NRG in NR, different BRU is defined. We define "basic resource unit size" which is the "time" of a BRU as the follows It is noted that any "non-numerology" defined region may or may not be included in time of BRU. Generally, it is assumed that non-numerology defined region is not included in the BRU nor NRG.

Define a set of subcarrier spacing that the system supports as {SC1, SC2, . . . , SCk}

Basic resource unit size set can be constructed as
A set of 'M' OFDM symbols assuming one OFDM symbol has one CP, where M=1, . . . , 14 or M=1, . . . , 16 or M=1, 2, 4, 6, 7, 12, 13, 14 . . . . (M can be integer values between {1, . . . , 16})

CP length set is
{CP1, . . . , CPm}

One basic resource unit size is defined as {SCi, CPj, Mk} (in other words, numerology set and OS number)

To allow coexist with LTE, SCi=15 kHz, CPj=LTE normal CP, Mk=14 is supported, also {15 kHz, ECP, 12} is also supported.

To support MBMS between LTE and NR, SCi=15 kHz, CPj'=LTE extended CP, Mk=12 or Mk=10 is supported (or any other numerology set defined in MBMS services)

When {SCi, CPj, Mk} is a resource unit, sub-resource units (or mini-resource units) to support lower latency can be defined as
For integer values 1<=Km<=Mk/2, {SCi, CPj, Km} can be defined
Within a resource unit, multiple M/Km sub-resource units can be defined.
The location of sub-resource units are flexible and may not be present in every resource unit, and can be applied dynamically.

More specifically, we propose a few examples in below.

TABLE 1

| Average CP length | Symbol length | CP OH | Number of OFDM symbol in a subframe | Remaining duration |
|---|---|---|---|---|
| 1.189643 | 66.67 | 0.017844 | 14 | 49.965 |
| 2.379286 | 66.67 | 0.035688 | 14 | 33.31 |
| 4.758571 | 66.67 | 0.071375 | 14 | 0 |
| 10.25308 | 66.67 | 0.153788 | 13 | 0 |
| 16.66333 | 66.67 | 16.66333 | 12 | 0 |
| 1.189643 | 33.335 | 0.035688 | 14 | 16.655 |
| 2.379286 | 33.335 | 0.071375 | 14 | 0 |
| 4.758571 | 33.335 | 0.14275 | 13 | 4.783571429 |
| 5.126538 | 33.335 | 0.153788 | 13 | 0 |
| 8.331667 | 33.335 | 0.249938 | 12 | 0 |
| 10.25308 | 33.335 | 0.307577 | 11 | 20.53115385 |
| 16.66333 | 33.335 | 0.499875 | 10 | 0.016666667 |
| 0.594821 | 16.6675 | 0.035688 | 14 | 8.3275 |
| 1.189643 | 16.6675 | 0.071375 | 14 | 0 |
| 2.379286 | 16.6675 | 0.14275 | 13 | 2.391785714 |
| 2.563269 | 16.6675 | 0.153788 | 13 | 0 |
| 4.165833 | 16.6675 | 0.249938 | 12 | 0 |
| 4.758571 | 16.6675 | 0.2855 | 11 | 14.31321429 |
| 5.126538 | 16.6675 | 0.307577 | 11 | 10.26557692 |
| 6.059773 | 16.6675 | 0.363568 | 11 | 0 |
| 8.3325 | 16.6675 | 0.499925 | 10 | 0 |
| 10.25308 | 16.6675 | 0.615154 | 9 | 7.714807692 |
| 16.66333 | 16.6675 | 0.99975 | 7 | 16.68416667 |

Assuming FFT=2048, a few examples can be represented as the follows

TABLE 2

| CP length in Ts | Symbol length in Ts | Subcarrier spacing | Number of OFDM symbol in a subframe | Remaining duration in Ts in 1 msec |
|---|---|---|---|---|
| 36 | 2048 | 15 kHz | (uniform CP = 1/4 of LTE 2$^{nd}$ OS NCP) 14 | 772 * 2 (772 in 0.5 msec) |
| 72 | 2048 | 15 kHz | (uniform CP = 1/2 of LTE 2$^{nd}$ OS NCP)14 | 520 * 2 (520 in 0.5 msec) |
| 160/144 | 2048 | 15 kHz | (LTE NCP)14 | 0 |
| 316/315 | | | 13 | 0 |
| 304 | | | 13 | 144 |
| 512 | | | (ECP) 12 | 0 |

In other words, in a subframe, depending on subcarrier spacing, the symbol length is defined, and various CP length can be defined which then can form 9, 10, 11, 12, 13, 14 OFDM symbols with or without remaining portion. Very small remaining portion may be incorporated in one or a few OFDM symbols' CP length.

In other words, multiple pairs of {CP length, OFDM symbol, number of OFDM symbols} in a subframe can be defined. Overall, the following set can be an example of candidates.

{4.75 (same CP length to LTE), 15 kHz, 14}, {extended CP of LTE, 15 kHz, 12}, {half of LTE normal CP length, 30 kHz, 14}, {~5.12 us, 30 kHz, 13}, {8.33 us, 30 kHz, 12}, {¼$^{th}$ of LTE normal CP length, 60 kHz, 14}, {~2.56 us, 60 kHz, 13}, {4.17 us, 60 kHz, 12}, {6.06 us, 60 kHz, 11}, {8.33 us, 60 kHz, 10}

In aligning different subcarrier spacing values with same CP overhead (e.g., same CP overhead to LTE NCP), some handling may be necessary to allow symbol-level combining. One approach is to reserve "first" 16 Ts (assuming 2048 FFT), and only the first OS in every 1 msec can have the very long CP compared to other OS. Alternatively, this can be started from the reference numerology set where the remaining portion would be CP1-CP 2 based on the reference numerology where CP1 is the longer CP than CP2 used in the reference numerology set (e.g., CP1=160, CP2=144 with 2048 FFT 15 kHz). It is however noted that if SC2=n SC0 where SC0 is the subcarrier spacing of a reference numerology, reserved portion (to have the same value) should be increased to 16*n Ts (if the same FFT is used, and if FFT size is reduced, 16 Ts is maintained). In case subcarrier spacing is reduced compared to reference SC, it will be used in OS to overlap with this CP1 of SC0 (thus it is possible that there are more than one OS in each slot). In the rule is to use the remaining CP 16 Ts of SC0 in the OS of SCi which is overlapping with OS with CP1 of SC0. The following shows an example of this approach.

Figure 9:
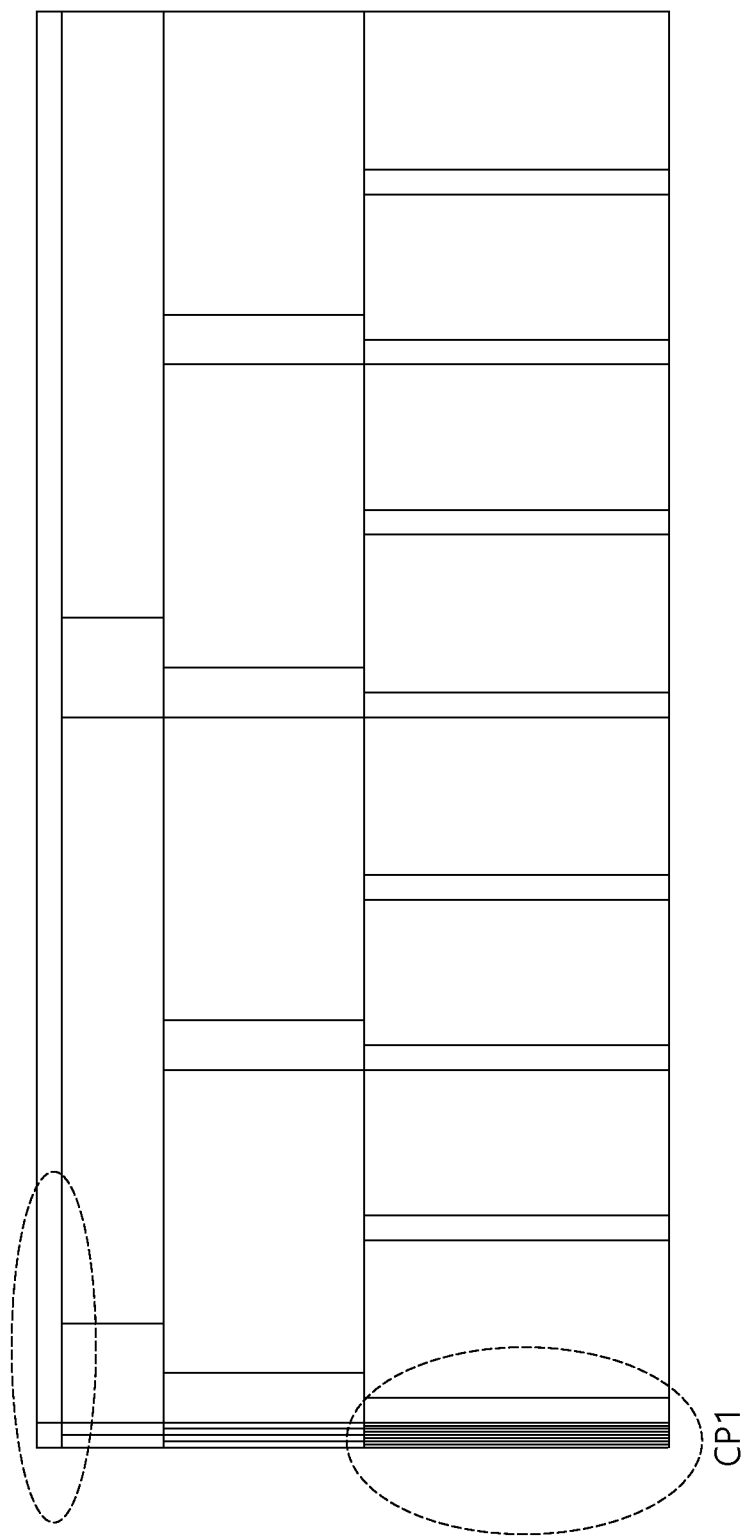
FIG. 9 shows an example of alignment option 1

FIG. 9 shows an example of alignment option 1

This long CP will be present in the first OS which overlaps with "CP1" of the reference SC. In other OS, linearly scaled CP is assumed to be used.

In terms of CP length of CP1 in each numerology assuming 15 kHz NCP as a reference, it becomes as the follows.

TABLE 3

| SC | FFT size | CP1, | CP2 |
|---|---|---|---|
| 30 | 2048 | 16 * 2 + 144 = 172 | 144 |
| 30 | 1024 | 16 + 72 = 88 | 72 |
| 60 | 2048 | 16 * 4 + 144 = 208 | 144 |
| 60 | 512 | 16 + 36 = 52 | 36 |
| 120 | 2048 | 16 * 4 + 144 = 272 | 144 |
| 120 | 256 | 16 + 18 = 34 | 18 |
| 7.5 | 2048 | 8 + 144 = 152 (CP1 is used in OS1, OS4) | 144 |
| 7.5 | 1024 | 16 + 72 = 288 (CP1 is used in OS1, OS4) | 72 |
| 3.75 | 2048 | 4 + 144 = 148 (CP1 is used in OS1, OS3, OS5, OS7) | 144 |
| 3.75 | 1024 | 16 + 72 = 88 (CP1 is used in OS1, OS3, OS5, OS7) | 72 |

This additional CP may not be used for CP, and may be considered as a separate special OS which can be used for some other purpose mentioned in this invention.

Figure 10:
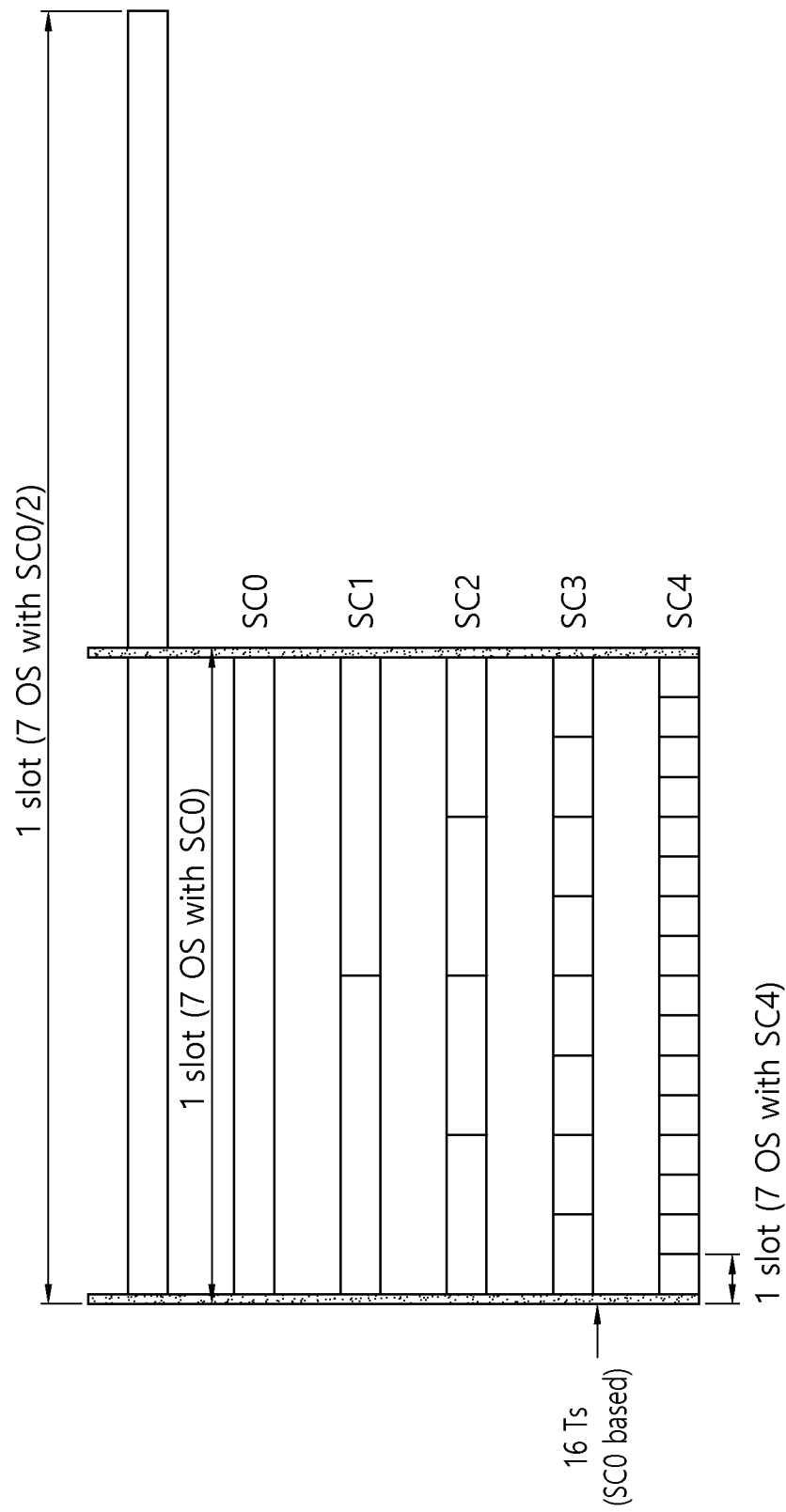
FIG. 10 shows an example of option 3.

If this is used, the slot boundary of each numerology can be as shown in FIG. 10.

I-2. Another Approach to Form "Extended" CP

I-2-1. Reference Numerology:

In NR, we may assume that subcarrier spacing SC0, . . . , SCN is supported where we can assume a reference subcarrier spacing as Alt1: the largest SC Alt2: the largest SC among subcarriers which can be multiplexed within a carrier or by the network or in a frequency band Alt 2: higher layer configured Alt3: fix as a value such as 15 kHz Alt 3-1: fix to a value in a frequency range (e.g., 15 kHz for below 6 GHz, 60 kHz for above 6 GHz, 240 kHz for above 30 GHz)

Alt4: the smallest SC

Alt 5: the smallest SC among subcarriers which can be multiplexed within a carrier or by the network or in a frequency band Alt 6: middle value among subcarriers which can be multiplexed within a carrier or by the network or in a frequency band Reference numerology may be used for synchronization. There could be "default numerology" defined which can be used for common data scheduling, at least for downlink transmission. Based on default numerology, subframe can be defined. Or, it can be called as "default slot".

It may be also assume that "the minimum unit" of the reference SC can be used as a unit to switch numerology in time-domain from a frequency region. It's assumed that there is "minimum" unit in frequency domain which can be used with different numerology as well as minimum unit in time domain which can be used with different numerology or minimum switching points.

Also it is noted that DL and UL can be different to utilize SC value, further it may be also different per usage scenario or per sidelink and backhaul.

"Minimum" unit should be some meaningful value which should allow "smooth" transition between numerologies. Generally it is desired that minimum unit can be defined by the smallest SC among the candidates or among a set configured by the network or by the spec. For example, assuming {3.75 kHz, 7.5 kHz, 15 kHz, 30 kHz, 60 kHz} as a set, 60 kHz can be used as "minimum" unit. More generally, {SC0/2^n, SC0/2^n-1, . . . , SC0/2^1} where SC0 defines minimum unit. If all SC can be multiplexed in a dynamic manner, the minimum unit size can be somewhat desirably covering at least one OS of the largest SC. Otherwise, it is possible that switching can occur during the OS of the largest/large SC OS symbol which can degrade or jeopardize the performance. Alternatively, minimum switching time can be differently between pairs (e.g., between SC0, SC0/2, minimum switching can be 2, between SC0, SC0/4, minimum switching can be 4, and so on). Based on the minimum switching values of different SC, multiple combinations can be possible.

Figure 11:
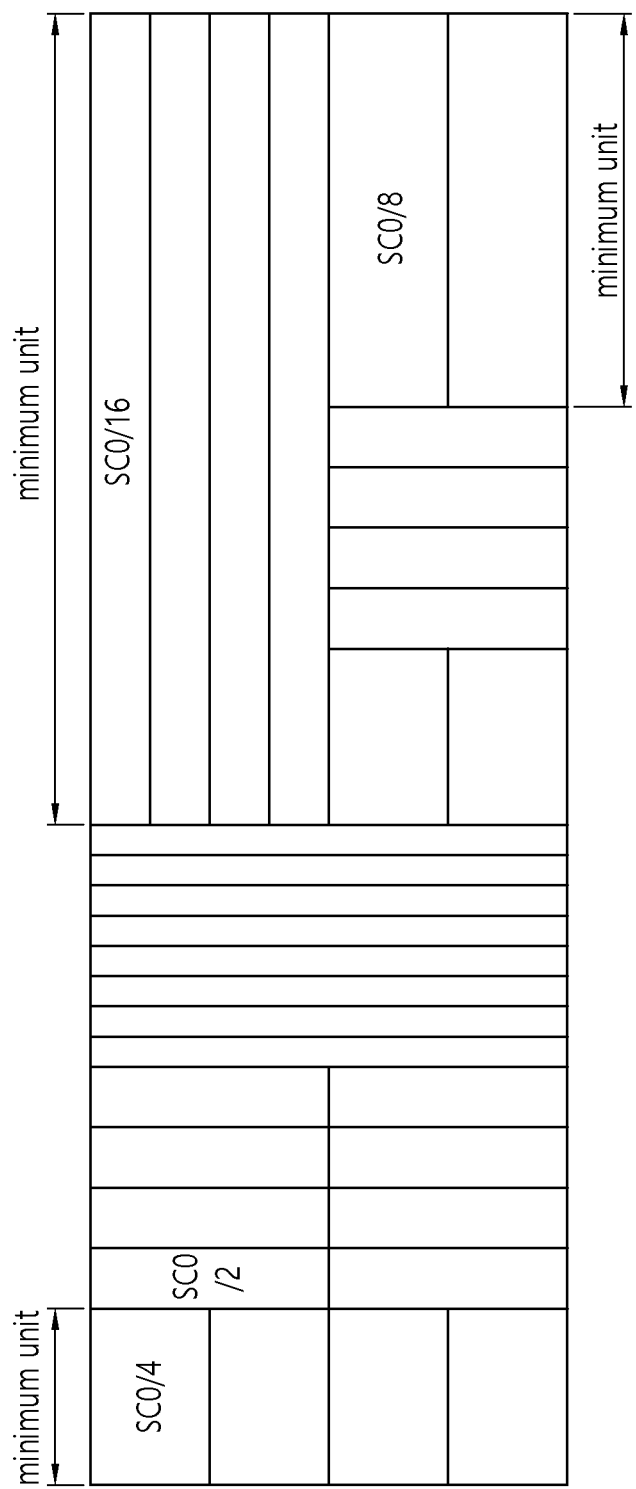
FIG. 11 shows an example of potential multiplexing option among different numerology.

So far, it has been discussed with "SC" which defines "OS (orthogonal symbol)" length. To allow seamless switching, it is desirable that "CP (cycle prefix)" length would be also linearly increased with smaller SC. One example of potential multiplexing option among different numerology thus can be illustrated in FIG. 11

Here, it is assumed that "CP" is linearly scaled up or down based on OS length to align in symbol level among different numerologies. However, in some cases, it should be considerable to consider "extended" CP case with the same subcarrier spacing or "no CP" case with the same subcarrier spacing. In general, more flexible CP length should be considered with a given subcarrier spacing to support various scenarios. For example, for high reliability or high throughput requiring UEs can be serviced with the same OS with longer CP whereas other UEs can be serviced with shorter CP. In this case, multiplexing among different CP length should be also considered. In LTE, longer CP or extended CP is introduced as "ECP*6+6 OS length=NCP*7+7*OS length". In NR, it is considerable to further relax this requirement based on "minimum unit" which can be potentially different per subcarrier spacing value or depending on the minimum unit of "reference SC".

For example, if the minimum unit size is "4 OS", ECP options can be

3*ECP+3*OS=4*NCP+4*OS

2*ECP+2*OS=4*NCP+4*OS

More generally, it can be summarized that the following multiplexing is supported.
- 60 kHz 3*ECP and 3 OS corresponds to 1 NCP and 1 OS with 15 kHz
- 60 kHz 7*ECP and 7 OS corresponds to 2 NCP and 2 OS with 15 kHz
- 60 kHz 3*ECP and 3 OS corresponds to 2 NCP and 2 OS with 30 kHz
- 60 kHz 3*ECP and 3 OS corresponds to 4 NCP and 4 OS with 60 kHz Similarly, 120 kHz 6*ECP and 6 OS corresponds to 1 NCP and 1 OS with 15 kHz can be considered. In other words, other alignment duration between NCP 15 kHz and other numerologies with different CP overhead can be considered where the alignment can occur in every OS with 15 kHz NCP or every two OS with 15 kHz NCP or every K OS with 15 kHz NCP (where K can be a positive integer).

Considering practical FFT size, CP length for different option can be summarized as in below.

TABLE 4

| Options | CP length |
|---|---|
| (1) 3 60 kHz ECP in every 15 kHz NCP symbol | 224 Ts (based on 15 kHz NCP 2048 FFT size) for the $1^{st}$, $2^{nd}$ and $3^{rd}$ symbols (i.e., three symbols correspond to the first OS in every slot with 15 kHz NCP). 224 Ts for the $4^{th}$ symbol, 216 Ts for the $5^{th}$ and $6^{th}$ symbols, and so on. (i.e., three symbols correspond to the $2^{nd}$-$7^{th}$ OS in every slot with 15 kHz NCP) |
| (2) 7 60 kHz ECP in every two 15 kHz NCP symbols | 120 Ts for the $1^{st}$ symbol, 116 Ts for the $2^{nd}$ to $7^{th}$ symbol. (i.e., 7 symbols correspond to $1^{st}$ & $2^{nd}$ OS in the first 0.5 msec with 15 kHz NCP or $7^{th}$ OS and $1^{st}$ OS in the first/second 0.5 msec, i.e., 2 OS containing long CP OS) 116 Ts for the $8^{th}$ to $11^{th}$ symbol, 112 Ts for the $12^{th}$ to $14^{th}$ symbol, and so on. (i.e., in other 2 OS not containing long CP OS) |

The CP length in the above table is determined based on the LTE time unit. Below table shows the CP length based on 2048-point FFT size.

TABLE 5

| Options | CP length CP length |
|---|---|
| (1) 3 60 kHz ECP in every 15 kHz NCP symbol | 896 samples (based on 15 kHz NCP 2048 FFT size) for the $1^{st}$, $2^{nd}$ and $3^{rd}$ symbols. (i.e., three symbols correspond to the first OS in every slot with 15 kHz NCP). 896 samples for the $4^{th}$ symbol, 864 samples for the $5^{th}$ and $6^{th}$ symbols, and so on. (i.e., three symbols correspond to the $2^{nd}$-$7^{th}$ OS in every slot with 15 kHz NCP) |
| (2) 7 60 kHz ECP in every two 15 kHz NCP symbols | 480 samples for the $1^{st}$ symbol, 464 samples for the $2^{nd}$ to $7^{th}$ symbol. (i.e., 7 symbols correspond to $1^{st}$ & $2^{nd}$ OS in the first 0.5 msec with 15 kHz NCP or $7^{th}$ OS and $1^{st}$ OS in the first/second 0.5 msec, i.e., 2 OS containing long CP OS) 464 samples for the $8^{th}$ to $11^{th}$ symbol, 448 samples for the $12^{th}$ to $14^{th}$ symbol, and so on. (i.e., in other 2 OS not containing long CP OS) |

In increasing CP, one obvious option is to take next level SC which will double the CP. This approach however will reduce the effective number of OS symbols in a given time duration, and thus, could increase the overall overhead of "unpaired spectrum operation" In that sense, considering different options can be also considered which is not exactly reduce the OS to half One example can be when minimum unit size is "7 OS" with 60 kHz, the following can be considered as potential ECP options as in below. Note that FFT size is assumed to be 2048 with 60 kHz subcarrier spacing.

TABLE 6

| CP1 | OS1 | CP2 | OS2 | CP3 | OS3 | CP4 | OS4 |
|---|---|---|---|---|---|---|---|
| 208 | 2048 | 144 | 2048 | 144 | 2048 | 144 | 208 |
| 480 | 2048 | 464 | 2048 | 464 | 2048 | 464 | 2048 |
| 896 | 2048 | 896 | 2048 | 896 | 2048 | 896 | 2048 |

| CP5 | OS5 | CP6 | OS6 | CP7 | OS7 | CP8 |
|---|---|---|---|---|---|---|
| 144 | 2048 | 144 | 2048 | 144 | 2048 | 144 |
| 464 | 2048 | 464 | 2048 | 464 | 2048 | |
| 864 | 2048 | 864 | 2048 | | | |

CP overhead can be evenly distributed to all OS where the rule is n*CP=m*CP+FFT_size*(m−n) (n is the number of OS of ECP, and m is the number of OS in NCP), and the remaining can be distributed to the first OS or distributed to a few OFDM symbols to meet minimum FFT size. As this number may provide somewhat undividable Ts by 16, rounding to 16 should be considered, and the renaming CP can be forwarded to the first OS as follows (where first symbol can be further rounding, and some Ts can be left unused). The idea is to make CP even as much as possible, and be a multiple of 16 Ts, and remaining can be distributed over multiple symbols or to the first symbol which may not be used for CP. To align between different numerology at a few OFDM symbols (e.g., 1 or 2 OS of 15 kHz NCP or 2 OS or 4 OS of 30 kHz or generally K OS of SCi NCP), this applying CP to the first symbol of larger subcarrier spacing occurs in the boundary of K OS of SCi NCP (e.g., 1 OS of 15 kHz NCP or 2 OS of 30 kHz NCP or 2 OS of 15 kHz NCP or 4 OS of 30 kHz NCP).

TABLE 7

| CP2 | OS2 | CP3 | OS3 | CP4 | OS4 |
|---|---|---|---|---|---|
| 24144 | 2048 | 144 | 2048 | 144 | 2048 |
| 24464 | 2048 | 464 | 2048 | 464 | 2048 |
| 24896 | 2048 | 896 | 2048 | 896 | 2048 |

| CP5 | OS5 | CP6 | OS6 | CP7 |
|---|---|---|---|---|
| 144 | 2048 | 144 | 2048 | 144 |
| 464 | 2048 | 464 | 2048 | 464 |
| 864 | 2048 | 864 | 2048 | |

By this way, at least in every 8 OS, this will be aligned with the higher subcarrier spacing. This however may increase the overall CP overhead.

Though increasing CP overhead is not well fitted with 15 kHz based SC numerology, it is considerable to increase the number of OS (i.e., decreasing CP overhead to zero). It will allow "14 OS" in a given SC to "15 OS". However, if SC0 uses "uneven" CP, 14 OS may not become 15 by totally removing CP. The first OS may still have CP of 32 depending on the alignment with other numerology. For example, if four symbols with 160 Ts CPs are used, 32 CP is assumed in the first OS. In case, 14 OS has "144" Ts CP, it can not be changed to 15 OS as it is lacking of "32 Ts". Thus, to have 15 OS, it should be created in every for example 0.25 msec with 60 kHz where 15 OS can be placed within 0.25 msec. However it is noted that there could be alignment between ECP with 12 OS (from 14 NCP OS) and ZCP with 15 OS (from 14 NCP OS). 4 OS from ECP is aligned with 5 OS from ZCP. As one unit of 14 NCP OS can be divided to 3 time unit where DL/GP/UL can consists of:

3 OS from ECP, GP, 1 OS from UL (assuming 2048 FFT)

TABLE 8

| CP1 | OS1 | CP2 | OS2 | CP3 | OS3 | GP | CP5 | O5 |
|---|---|---|---|---|---|---|---|---|
| 512 Ts | 2048 Ts | 512 Ts | 2048 Ts | 512 Ts | 2048 Ts | 512 Ts | 0 | 2048 Ts |

1 OS from ECP, GP, 4 OS from UL

TABLE 9

| CP1 | OS1 | GP | CP3 | OS3 | CP4 | OS4 | CP5 | OS5 |
|---|---|---|---|---|---|---|---|---|
| 512 | 2048 | 1536 | 0 | 2048 | 0 | 2048 | 0 | 2048 |

It is noted that it is also usable for all DL or all UE where 4 ECP OS DL can be mapped to 5 ZCP OS DL.

Also, this can be used with normal CP where the remaining can be used for GP (see example below).

TABLE 10

3DL/GP/1UL

| CP1 | OS1 | CP2 | OS2 | CP3 | OS3 | GP | CP5 | O5 |
|---|---|---|---|---|---|---|---|---|
| 144 | 2048 | 144 | 2048 | 144 | 2048 | 1616 | 0 | 2048 |

1DL/GP/3UL

| CP1 | OS1 | GP | CP3 | OS3 | CP4 | OS4 | CP5 | OS5 |
|---|---|---|---|---|---|---|---|---|
| 144 | 2048 | 1904 | 0 | 2048 | 0 | 2048 | 0 | 2048 |

This can be generalized to any OS where the remaining portions can be applied to GP.

This aspect can be also generalized to multiple numerologies as the follows where different OS can be taken from different numerology with CP/SC pair (where necessary misalignment between two numerologies can be assumed as "gap").

Figure 12:
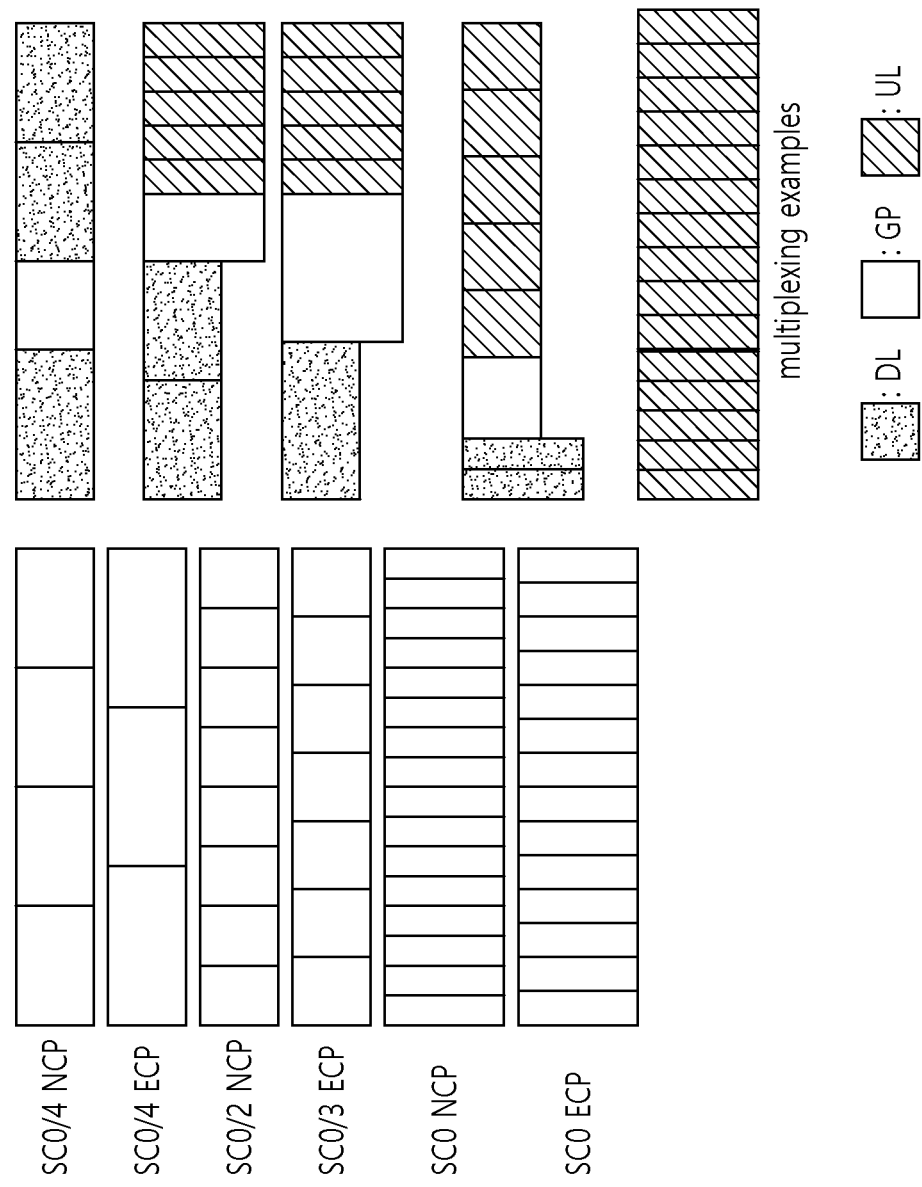
FIGS. 12 and 13 shows examples of different orthogonal symbol lengths.
Figure 13:
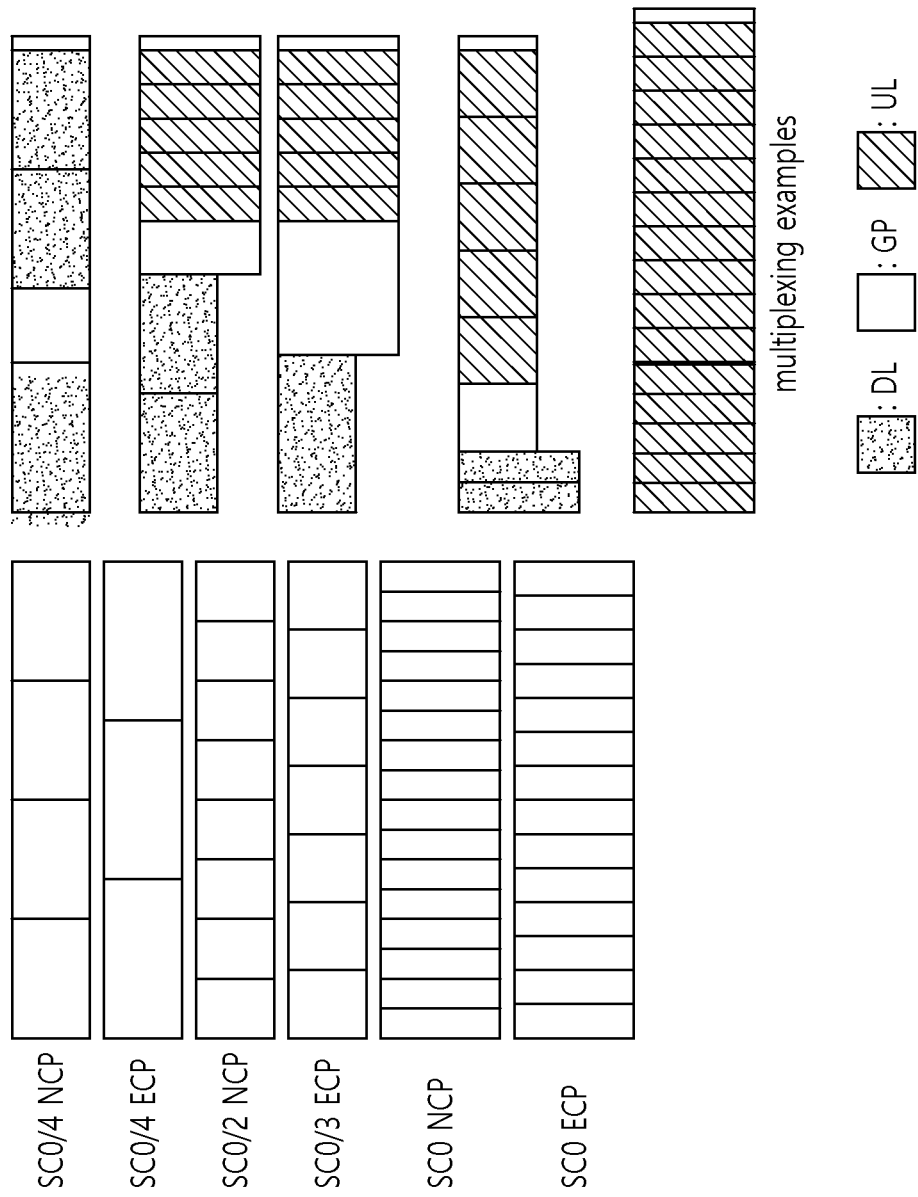

FIGS. 12 and 13 shows examples of different orthogonal symbol lengths.

The examples as shown in FIG. 12 are based on the assumption that TA or propagation delay is zero. In case TA is considered, as shown in FIG. 13, small gap in the UL could be necessary for TA and which will shift "UL" OS boundary with TA or propagation delay.

More generally, the number of OS in DL and UL can be different with the same subcarrier spacing due to different CP usage or assumption. In that case, alignment between different numerology becomes a bit challenging, particularly, in case full duplex capability is assumed or one FFT is assumed over DL and UL portion (e.g., DL portion is used for backhaul vs UL portion is used for Uu interface). However, due to different CP overhead needs, it can be considered to support either different CP with same subcarrier spacing or different subcarrier spacing between DL and UL at the same time.

Figure 14:
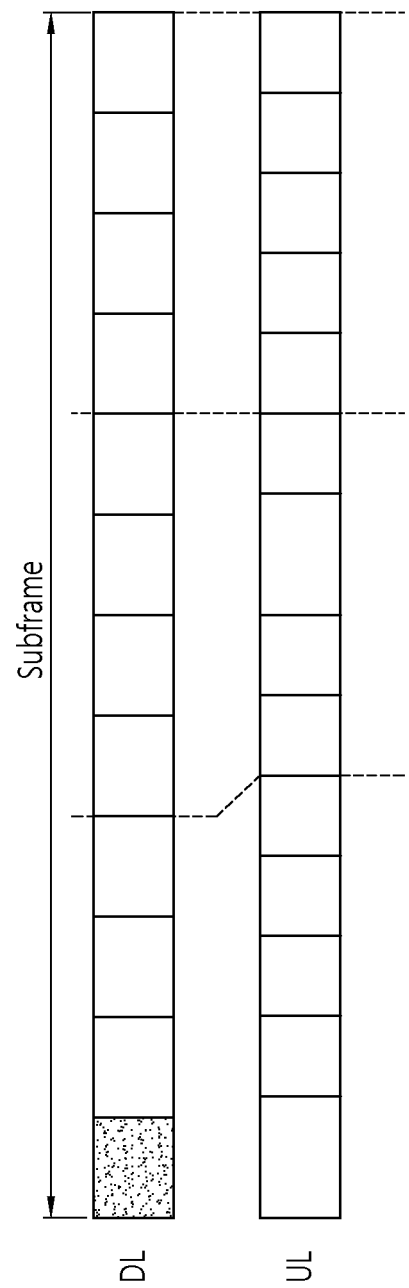
FIGS. 14 through 16 show examples of NCP and ECP is used in DL and UL respectively.
Figure 15:
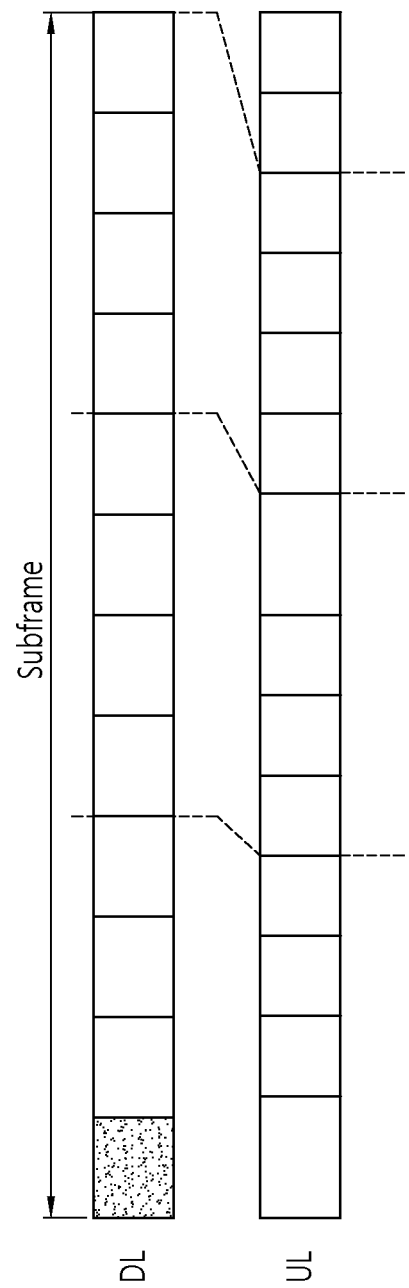
Figure 16:
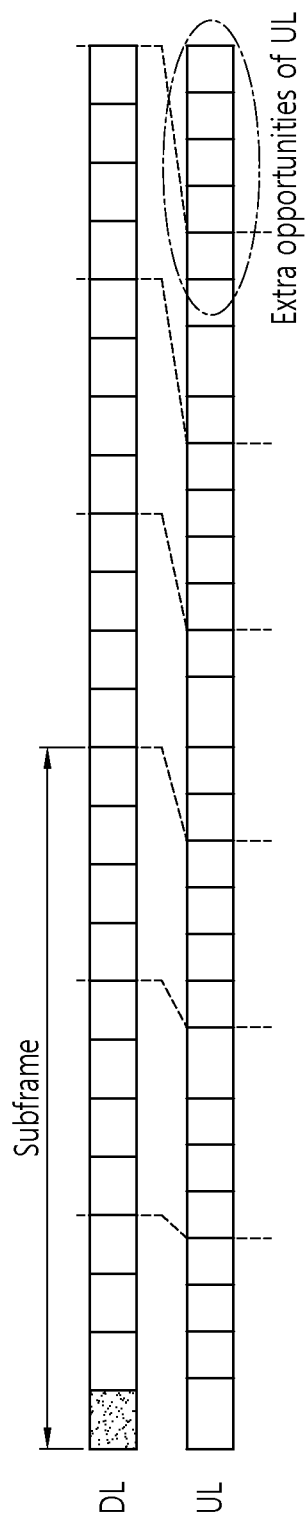

FIGS. 14 through 16 show examples of NCP and ECP is used in DL and UL respectively.

With different number or misalignment between DL and UL, processing time on UL could be more relaxed. Alternatively, some symbols in UL can be left for some other purposes (same as "special OS" in this invention) as shown in FIG. 15

With this, corresponding A/N latency can be reduced (e.g., OFDM symbol 8 can transmit A/N instead of OFDM symbol 9 or 10 which is UL timing corresponding to DL, in other words, implicit UL subframe boundary can be considered with this approach. Also, UL mini-subframe with 4 OS can be constructed over two subframes, i.e., 7*4 OS sTTI or mini-subframes, which will allow more opportunities to transmit A/N and other UCI or PUSCH transmission as shown in FIG. 16.

I-2-2. Mini-Slot/Subframe Size

Supported mini-slot size at least includes the followings

In case default numerology is different to numerology for mini-slot. Default numerology can be used for sync and/or common data at least for downlink transmission. Alternatively, default numerology is the numerology used for eMBB or high data rate or configured by higher layer.

TABLE 11

| default numerology | transmission numerology for mini-slot | sizes of mini-slot |
|---|---|---|
| 15 | 30 | 2, 4 |
| 15 | 60 | (2), 4, 8 |
| 30 | 60 | 2, 4 |
| 60 | 120 | 7 |

In case 8 is configured, it may be assumed that 8 OS mini-slot is aligned with 2 OS mini-slot of default numerology. In case 4 is configured, it may be assumed that 4 OS mini-slot is aligned with 2 OS mini-slot of default numerology.

In case default numerology is the same to numerology for mini-slot:

TABLE 12

| transmission numerology for mini-slot | size of mini-slot |
|---|---|
| 15 | 2 |
| 30 | 2, 4 |
| 60 | 7 |
| 120 | 7, 14 |
| 240 | 7, 14 |

In case 4 OS mini-slot is defined, within 14 OS of slot, 2-4-4-4 or 4*7 mini-slots over 28 OS can be considered.

Mini-slot size of 7 or 8 can be configurable.

For the slot size, 14 is assumed, and multiple of 14 can be configured as a slot size. For default slot size for high subcarrier spacing, it can be prefixed to 28 for certain frequency ranges or higher subcarrier spacing.

I-2-3. Alignment Between ECP and NCP

Note that ECP referred in this invention can represent any longer CP overhead compared to normal CP overhead of LTE.

To efficiently support various scenarios, consideration of extended CP is necessary where the alignment between extended CP(s) and other normal CP(s) should be considered.

Generally, it is desirable to align one numerology "K" symbol and another numerology "M" symbol based on a base numerology where "K" is desirably '1'.

This invention discusses a few options with different value "K".

Numerology is defined as {SCi, CPi1, CPi2} where SCi is the subcarrier spacing which can be represented as "SC0*m" with SC0 is the base numerology, and CPi1 is the longer CP and CPi2 is the shorter CP length used with SCi. It is noted that three different CP lengths can be used, but this invention focuses on the case where at most two different CP lengths can be used. In case, NCP, it is assumed that CPi1=CP01/m, CPi2=CP02/m, and the number of OS within 1 msec with {SC0, CP01, CP02} is assumed to be multiple of 14.

(1) K=1

For NCP case, the mechanisms mentioned in this invention can cover the alignment between two numerologies {SCi, CPi1, CPi2}, and {SC0, CP01, CP02}.

In case extended CP (longer CP than normal CP) is considered in this case, the following option(s) can be considered Case1: Within a symbol, one ECP OS is placed: OS symbol duration becomes half, the CP is the sum of CP length of OSj corresponding to SC0+half of OS symbol duration of SC0

Case2: Within a symbol, two ECP OSs are placed: OS symbol duration becomes ¼, the CP is (the sum of CP length of OSj corresponding to SC0+half of OS symbol duration of SC0)/2

Case 3: Within a symbol, three ECP OSs are placed: OS symbol duration becomes ¼, the CP is (the sum of CP length of OSj corresponding to SC0+¼ OS symbol duration of SC0)/3

Case 4: Within a symbol, four ECP OSs are placed. Symbol duration becomes ⅛

(2) K=2

Case 4: three ECP OSs are placed within 2 NCP OS (symbol length becomes half of SC0)

Case 5: three ECP OSs are placed within 2 NCP OS (symbol length becomes ¼th of SC0)

Other cases with 1 ECP OS or 2 ECP OSs can be also considered (3) K=4

Case 6: 7 ECP OSs are placed within 4 NCP OS (symbol length becomes half of SC0)

Case 7: 7 ECP OSs are placed within 4 NCP OS (symbol length becomes ¼ of SC0)

(4) K=½ or ¼

In case ECP is used with smaller subcarrier spacing (e.g., ½ of SC0, or ¼ of SC0), the symbol level alignment may work only in multiple OSs of SC0.

One example is to utilize 2 NCP OS of SC0, place 3 ECP OS with SCi=¼*SC0 within 1 msec or within a subframe based on SC0 NCP.

Another example is to utilize 2 NCP OS of SC0, place 2 ECP OS with SCi=¼*SC0 within 1 msec or within a subframe based on SC0 NCP.

The duration of CP/OS symbol in Ts of base numerology can be shown in below (if sampling rate increases with subcarrier spacing, the number will be increased).

TABLE 13

| Symbol level alignment | | Duration in Ts (of base numerology SC0), actual sampling rate can be different per different numerology | | | | | | | | | | | | |
|---|---|---|---|---|---|---|---|---|---|---|---|---|---|---|
| | | 1st OS | | 2nd OS | | 3rd OS | | 4th OS | | 5th OS | | 6th OS | | 7th OS | |
| Base | | 160 | 2048 | 144 | 2048 | 144 | 2048 | 144 | 2048 | 144 | 2048 | 144 | 2048 | 144 | 2048 |
| Case 1 (1ECPOS) | | 1184 | 1024 | 1168 | 1024 | 1168 | 1024 | 1168 | 1024 | 1168 | 1024 | 1168 | 1024 | 1168 | 1024 |
| Case 2 (2ECPOS) | 1st OS | 592 | 512 | 584 | 512 | 584 | 512 | 584 | 512 | 584 | 512 | 584 | 512 | 584 | 512 |
| | 2nd OS | 592 | 512 | 584 | 512 | 584 | 512 | 584 | 512 | 584 | 512 | 584 | 512 | 584 | 512 |
| Case 3 (3ECPOS) | 1st OS | 488 | 256 | 484 | 256 | 484 | 256 | 484 | 256 | 484 | 256 | 484 | 256 | 484 | 256 |
| | 2nd OS | 488 | 256 | 484 | 256 | 484 | 256 | 484 | 256 | 484 | 256 | 484 | 256 | 484 | 256 |
| | 3rd OS | 488 | 256 | 484 | 256 | 484 | 256 | 484 | 256 | 484 | 256 | 484 | 256 | 484 | 256 |
| | 4th OS | 488 | 256 | 484 | 256 | 484 | 256 | 484 | 256 | 484 | 256 | 484 | 256 | 484 | 256 |
| Case 4(3ECP in 2OS) | 1st OS | 464 (or 75) | 1024 | | | 448 (or 73) | 1024 | | | 448 (or 73) | 1024 | | | 448 (or 73) | 1024 |
| | 2nd OS | 432 (or 28) | 1024 | | | 432 (or 28) | 1024 | | | 432 (or 28) | 1024 | | | 432 (or 28) | 1024 |
| | 3rd OS | 432 (or 28) | 1024 | | | 432 (or 28) | 1024 | | | 432 (or 28) | 1024 | | | 432 (or 28) | 1024 |

TABLE 13-continued

| Symbol level alignment | | Duration in Ts (of base numerology SC0), actual sampling rate can be different per different numerology | | | | | | | | | | | | |
|---|---|---|---|---|---|---|---|---|---|---|---|---|---|---|
| | | 1$^{st}$ OS | | 2$^{nd}$ OS | | 3$^{rd}$ OS | | 4$^{th}$ OS | | 5$^{th}$ OS | | 6$^{th}$ OS | | 7$^{th}$ OS | |
| Case 4(3ECP in 2OS) | | 976 944 944 | 512 512 512 | | | 960 944 944 | 512 512 512 | | | 960 944 944 | 512 512 512 | | | 960 944 944 | 512 512 512 |
| Case 6(7ECP in 4OS) | 1$^{st}$ OS 2$^{nd}$ OS 3$^{rd}$ OS 4$^{th}$ OS 5$^{th}$ OS 6$^{th}$ OS 7$^{th}$ OS | 320 216 216 216 216 216 216 | 1024 1024 1024 1024 1024 1024 1024 | | | | | | | 304 216 216 216 216 216 216 | 1024 1024 1024 1024 1024 1024 1024 | | | | |
| Case 6(7ECP in 4OS) | 1$^{st}$ OS 2$^{nd}$ OS 3$^{rd}$ OS 4$^{th}$ OS 5$^{th}$ OS 6$^{th}$ OS 7$^{th}$ OS | 880 720 720 720 720 720 720 | 512 512 512 512 512 512 512 | | | | | | | 864 720 720 720 720 720 720 | 512 512 512 512 512 512 512 | | | | |

Another approach is to keep the same CP length for ECP case where remaining sampling times are left unused or reserved for some other purposes. Note that important consideration is to determine "K" to align among different numerologies where K can be 1 or 2 or 4 or 7 based on base numerology with NCP.

Another approach to provide extended CP is to use "smaller subcarrier spacing" with larger CP length. In this case, alignment between normal CP K OS and extended CP 1 OS can be considered.

Note that reference numerology or subcarrier referred in this invention can be 15 kHz NCP, or configured by network or indicated by synchronization signals.

In case reference numerology is 15 kHz NCP, the following options can be considered for alignment between different CP families for slot-level alignment. The similar mechanisms can be applied to different reference numerology.

Alignment between {SCi, CPx} and {15 kHz, NCP} (i.e., reference numerology): Slot is defined based on K number of OFDM symbols based on reference numerology, and any different subcarrier spacing with one CP overhead can be aligned with same SC with different CP overhead or between any different subcarrier spacing with different CP overhead. Alignment between {SCj, CPx} and {SCi, CPy} or {SCi, CPx} are done at subframe boundary.

Alignment between {SCi, CP0} and {SCi, CPy}: Slot is defined based on a given numerology, {SCi, NCP}, CP0. Between (SCi, CP0) and (SC_i, CP1) (i.e., same SC with different CP overhead), two are aligned at slot level defined by SCi. As slot length can be different to be aligned with reference numerology, different CP overhead with same SC can have also different CP length in each OFDM symbol. Alignment between {SCj, CPx} and {SCi, CPy} may not be achievable if each family has to align at symbol boundary level depending on symbol level alignment options.

In case symbol level alignment between 15 kHz and SCi=15*2^i is achieved via "distributing extra CP" to SCi symbols mapped to the larger CP OFDM symbol of reference numerology (Option 1 in the background), different CP overhead will be determined based on the location of SCi, normal CP OFDM symbol. For example, if 60 kHz, NCP consists of 7 OFDM symbols for slot, and the slot is placed in the first part of 1 msec boundary of 15 kHz subframe boundary (which includes longer CP OFDM symbols), the CP overhead will be evenly distributed to different CP families where possibly gap can be considered if CPs are not evenly distributed.

In case symbol level alignment is based on Option 2 in the background (FIG. 1), other CP family can have also longer CP in the first OFDM symbol in every 0.5 msec (or 0.5/2^m if reference numerology is 2^m*15 NCP), and other CP family can be created to have even CP length (as much as possible with potentially unused CP or the remaining CP may be contributed to one or more OFDM symbols within the slot)

In case symbol level alignment is based on Option 2-1 in the background (FIG. 2), other CP family can be created to have even CP length (as much as possible with potentially unused CP or the remaining CP may be contributed to one or more OFDM symbols within the slot). Reserving unused portion is desirable not to break symbol level alignment between {SCi, CPx} and {SCj, CPx} where CPx can be different from NCP. Or, reserved portion can be also added to the first or last OFDM symbol in each slot or in a time duration.

Example:

If different CP overhead is same as ECP (targeted, put 6 symbols to 7 NCP symbols with same subcarrier spacing), 7*NCP can be evenly distributed to 6 symbol, with SCi=60 kHz, CP length of ECP can be 126 with 8 Ts (based on LTE sampling rate) left. 8 Ts can be placed in every first symbol of slot. 8 Ts can be reserved or used in the first OFDM symbol. For SCi=30 kHz, CP can be 126*2, and 16 Ts can be reserved. To be better align with 60 kHz ECP, 16 Ts can be distributed to first symbol and 4$^{th}$ symbol or first and last OFDM symbol of 30 kHz slot (if slot is 7 OS).

Not to create any unnecessary misalignment, alignment can be done based on the largest SC, then symbol level alignment can be done from the largest SC for different CP family. In other words, for NCP, symbol level alignment is done at 15 kHz, and for ECP symbol level alignment is done at the largest SC (e.g., 240 kHz). Slot level alignment between NCP and ECP is done at the largest SC (e.g., 240 kHz).

Alternatively, symbol level alignment between different CP overhead other than NCP may not be assumed. And only slot level alignment between same subcarrier spacing is assumed. Others combinations are aligned at 1 msec or 0.5 msec.

I-2-5. Supporting URLLC Applications

Figure 17:
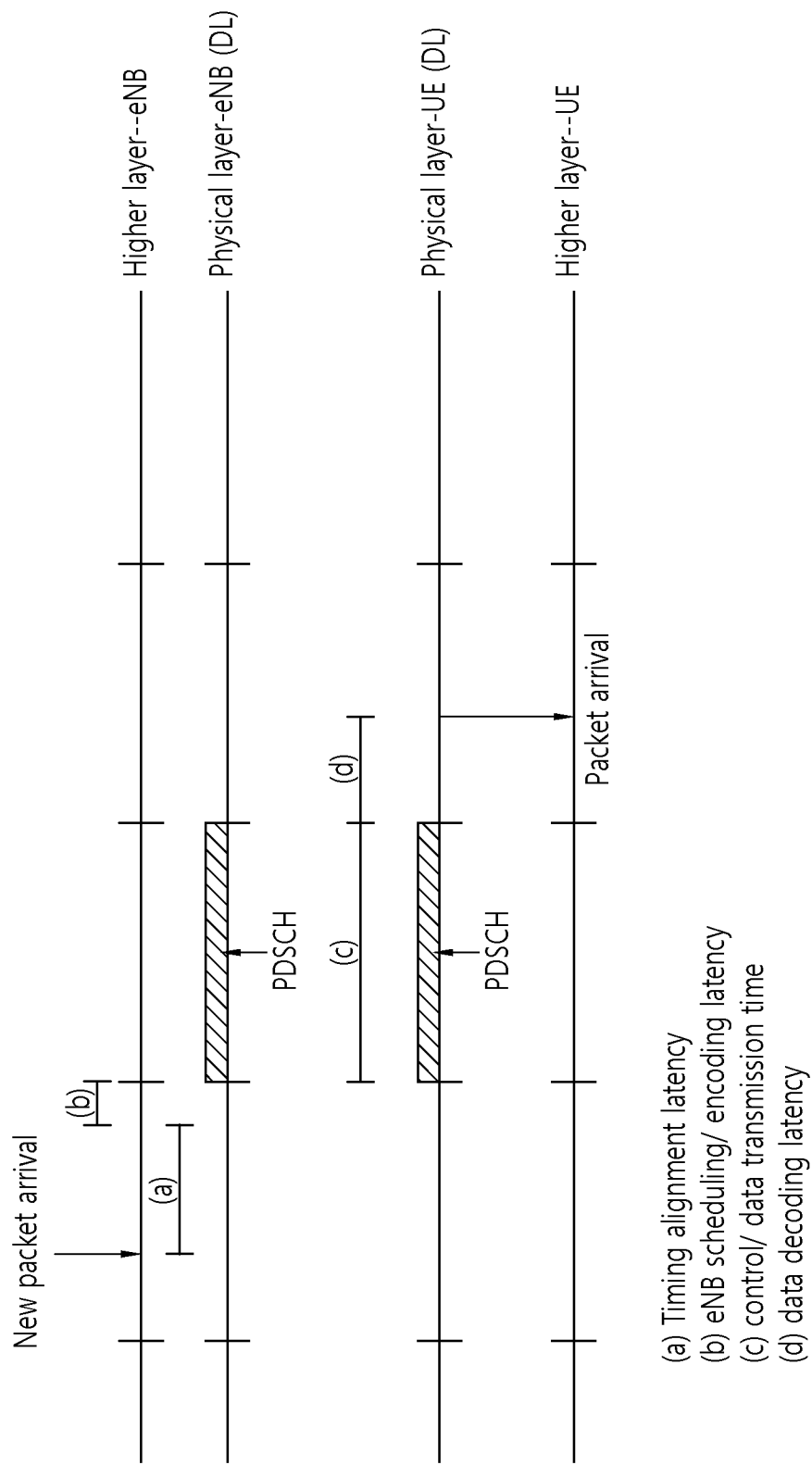
FIG. 17 shows a DL User plane latency without HARQ.
Figure 18:
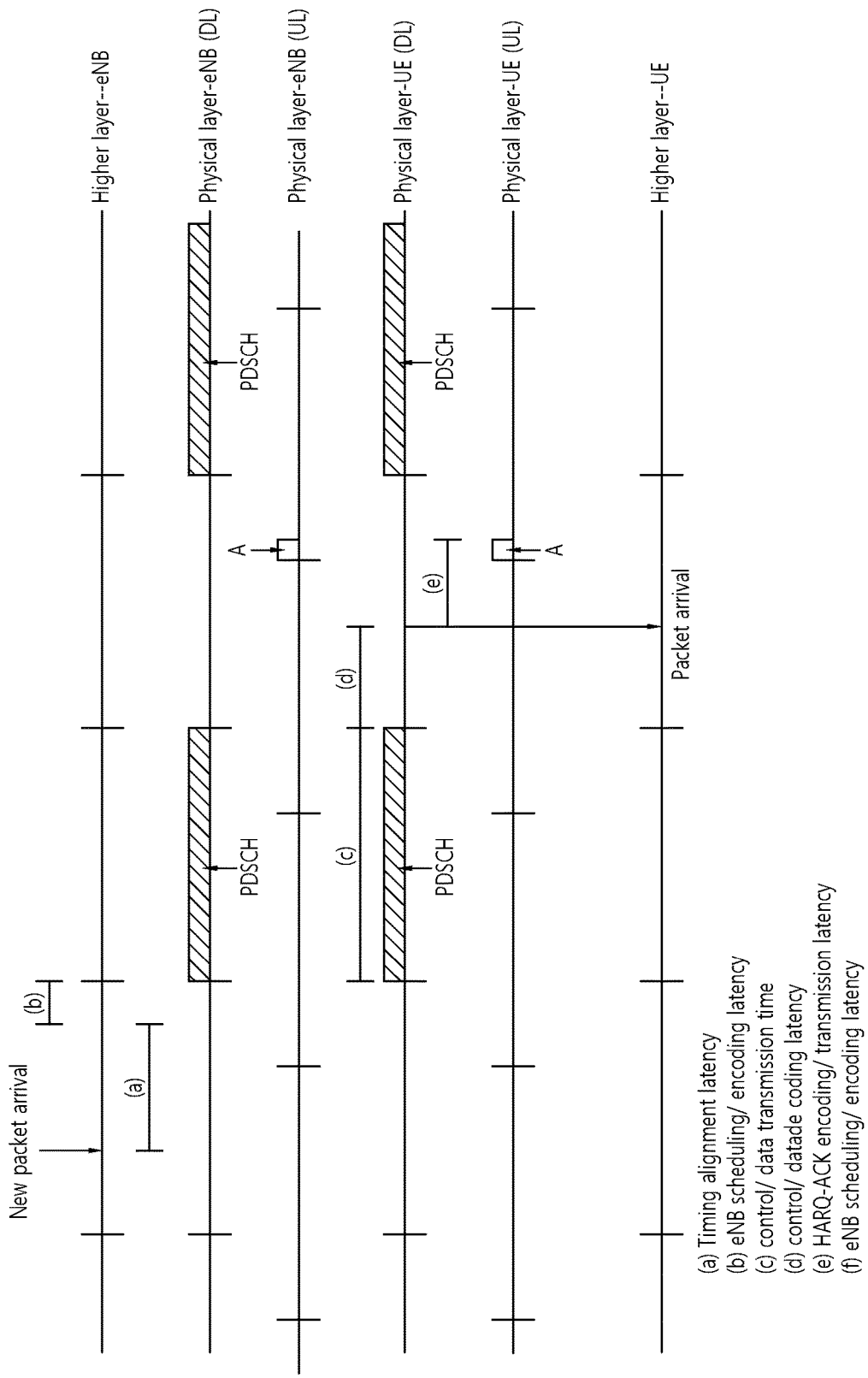
FIG. 18 shows DL user plane latency with HARQ.
Figure 19:
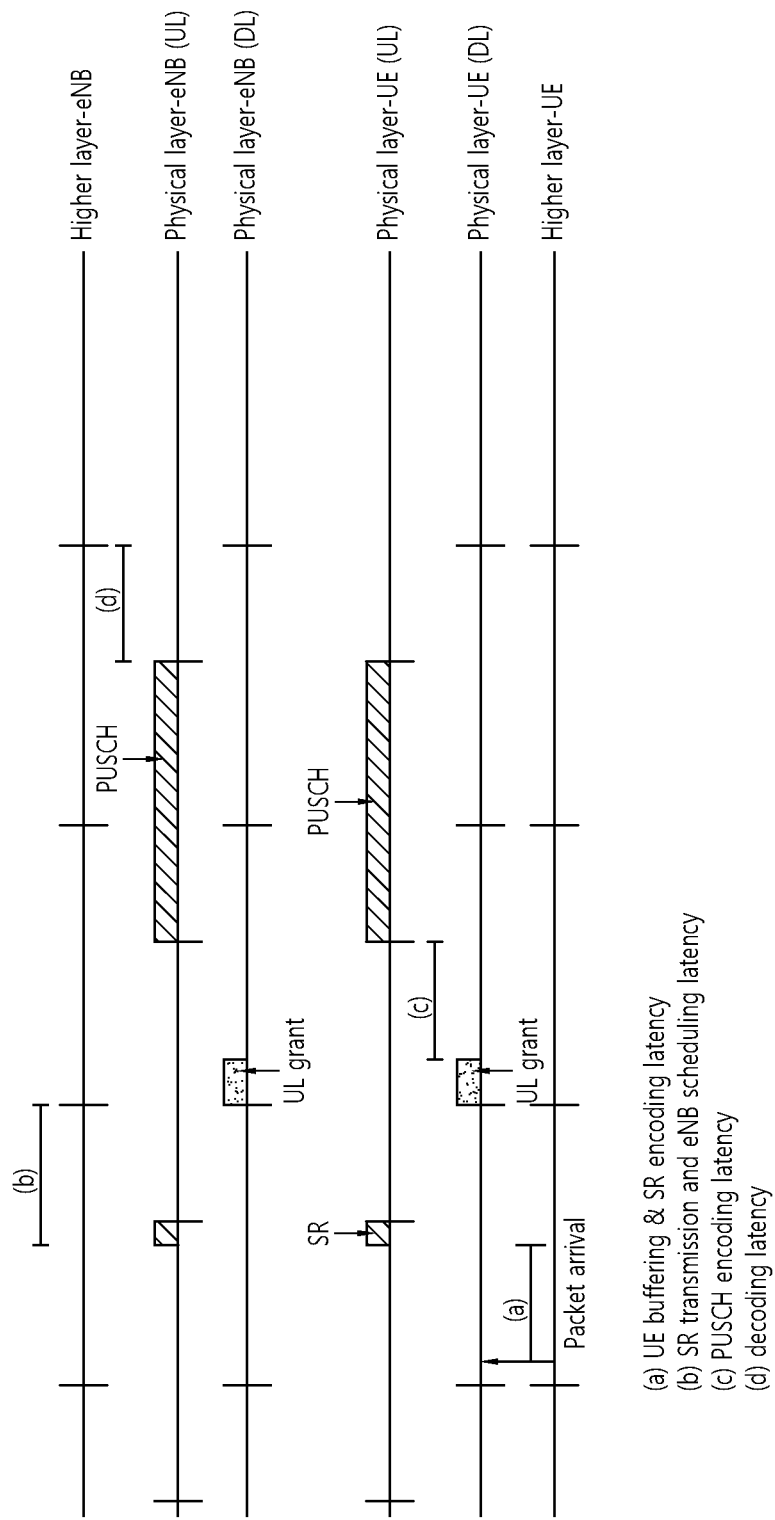
FIG. 19 shows UL user plane latency without HARQ.

URLLC applications require user-plane latency of 0.5 msec where the latency can be computed in FDD as shown in FIGS. 17 through 19.

In downlink latency computation, there are component which can be scaled with TTI length, and some components are TTI length agonistic.

For example, eNB scheduling/encoding latency is TTI length agnostic which may take absolute time to complete. However, this also may be scaled with TTI length as if TTI length decreased, the number of scheduling UEs can be reduced, and thus scheduling latency can be reduced. For the analysis, it is assumed that the delay is absolute delay regardless of scheduling UEs. Decoding latency is assumed to be also fixed based on the minimum packet size that the UE has to handle (e.g., 0.1 msec). Based on the current design, let's assume it takes 0.1 msec. Then the latency becomes 0.5*TTI+0.1 msec+1*TTI+0.1 msec (without HARQ)⇒1.5*TTI+0.2 msec Without HARQ+p*HARQ RTT⇒1.5*TTI+0.2 msec+0.1*2*TTI⇒1.7*TTI+0.2 msec To meet 0.5 msec, TTI budget can be less than 0.176 msec for both cases. Also, TTI should be larger than decoding latency to meet the 2*TTI HARQ RTT.

For UL transmission, if delay from packet arrival+SR transmission+eNB scheduling/encoding latency of UL grant is less than 1*TTI, and PUSCH can be transmitted at the next available uplink subframe, the overall latency becomes UE buffering+SR encoding latency+SR transmission time+eNB scheduling/encoding latency+PUSCH encoding latency+PUSCH transmission time+PUSCH decoding latency becomes 0.5*TTI+0.1*TTI+1 OFDM symbol+0.1 msec+0.4*TTI+1*TTI+0.2*TTI⇒2.2*TTI+0.1 msec+1 OFDM symbol (assumed to be 0.2*TTI)=2.4*TTI+0.1 msec. In this case, the budget of TTI becomes around 0.1667 msec.

In case TDD, within a TDD, to transmit the A/N in the same TTI where data is transmitted, the following seems required Control/data TX time+GP+A/N transmission+eNB scheduling/encoding<=1*TTI If the above condition is met, the latency in TDD can be 0.5*TTI+0.1 msec+1*TTI+0.1*1*TTI⇒1.6TTI+0.1 msec (with HARQ)

0.5*TTI+0.1 msec+1*TTI⇒1.5*TTI+0.1 msec (without HARQ)

Figure 20:
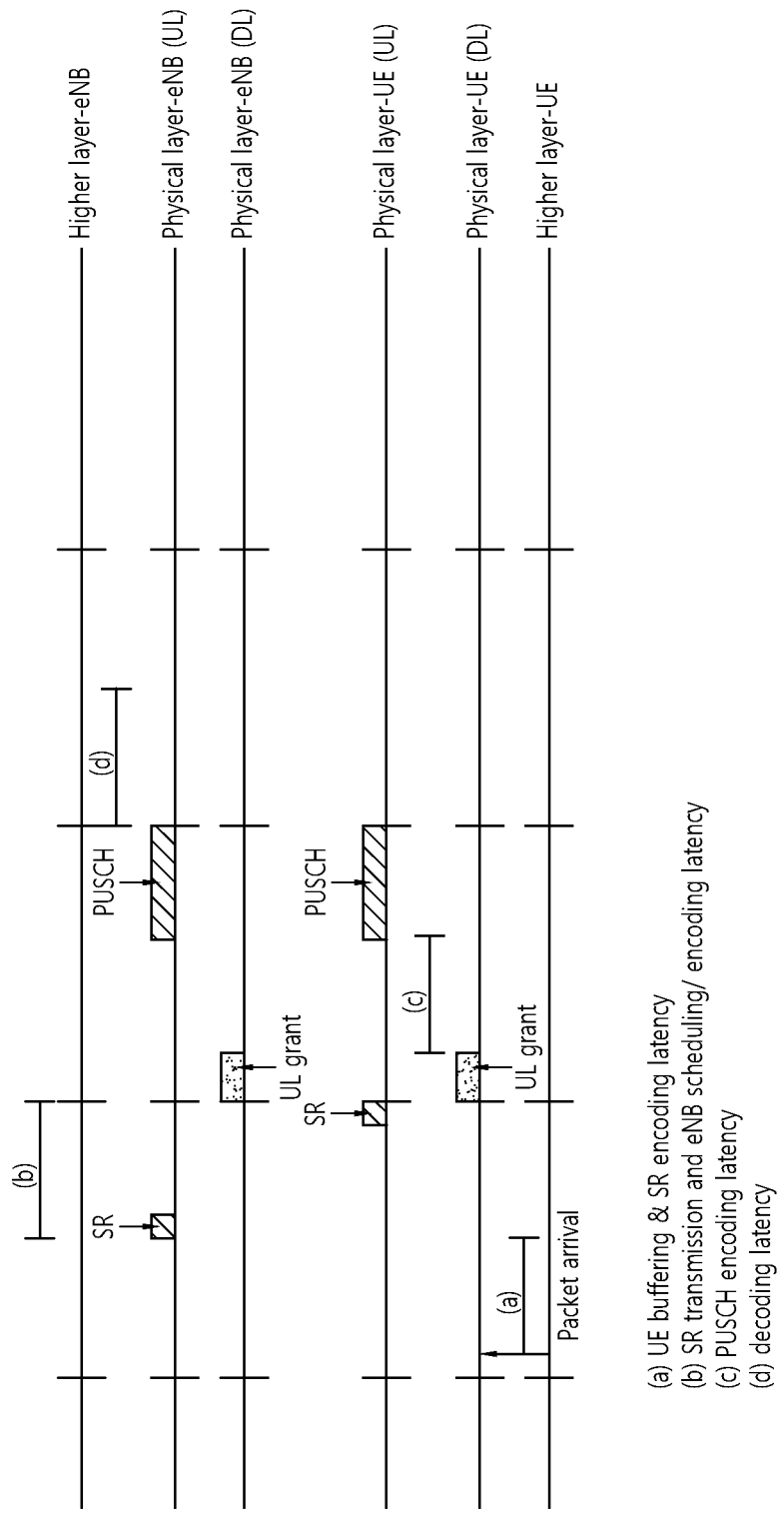
FIG. 20 shows UL latency example with TDD.

FIG. 20 shows UL latency example with TDD

For uplink transmission with TDD, with shorter transmission of PUSCH and self-scheduled TTI where UL grant and PUSCH can be occurred in the same TTI (given UE processing constraint), the latency can be further reduced where the budget of one TTI can be slightly larger than FDD case⇒0.5*TTI+0.1*TTI+1 OFDM symbol+0.1 msec+1*TTI+0.2*TTI⇒1.8*TTI+0.1 msec+1 OFDM symbol (assumed to be 0.2*TTI)=2*TTI+0.1 msec. In this case, the budget of TTI becomes around 0.2 msec.

This assumes that the latency may be reduced if self-contained structure (i.e., UL grant to PUSCH can occur in the same TTI or PDSCH to ACK/NACK can occur in the same TTI) is used. The similar approach can be also achieved in FDD if self-contained structure is assumed or early termination or partial PUSCH transmission is supported for URLLC applications. If control/data transmission time is reduced to be less than one TTI such that decoding latency can be accommodated in the same TTI, the latency can be reduced to 0.1 msec+1.5*TTI which gives about 0.266 msec TTI length. In other words, to reduce the overall latency, control/data transmission time can be reduced less than 1 TTI to allow potential decoding latency. If decoding latency is UE-specific, the overall transmission time can be adjusted per UE. Though in paired spectrum, GP for DL/UL switching and TA may not be necessary, to reduce the overall latency, GP can be configured which can be configured to allow decoding latency. In other words, similar to unpaired spectrum, transmission duration can be reduced to allow control/data transmission+decoding+A/N transmission+eNB scheduling/encoding latency can be minimized.

In case reliability target should be also met, user plane latency can be measured over the worst case. For example, if reliability target can be met with 1 retransmission, the overall latency worst case latency becomes frame alignment+eNB scheduling/encoding latency+control/data transmission+data decoding latency+HARQ RTT=0.5*TTI+0.1 msec+1*TTI+0.1 msec+2*TTI=0.2 msec+3.6 TTI.

To meet for example 1 msec latency, thus, about 0.22 msec TTI length needs to be supported for downlink transmission. For uplink transmission, the latency becomes UE buffering+SR encoding latency+SR transmission time+eNB scheduling/encoding latency+PUSCH encoding latency+PUSCH transmission time+PUSCH decoding latency+HARQ RTT=2.4*TTI+0.1 msec+2*TTI (assuming HARQ RTT is also 2 TTI for PUSCH)=4.4*TTI+0.1 msec, which gives about 0.225 msec TTI length.

This is to estimate the necessary TTI length for frame structure design. Final value can be different. Also, as mentioned in the above, the needed TTI length can be relaxed if partial transmission of PDSCH and/or PUSCH is used, and uplink transmission and/or downlink transmission with partial duration can occur in any time of TTI regardless of FDD/TDD.

This implies that the network can reduce the overall latency by controlling transmission burst duration. Thus, suggested TTI length for TDD can be also applicable to FDD. In FDD analysis, the following tables assume "full" transmission burst duration over the entire TTI.

If eNB processing can be also scaled, for example to 0.4*TTI, the latency can be bounded to 2*TTI which allows 0.25 msec TTI length. If 0.25 msec is the budget for TTI length, then control/data TX time should be less than 1−0.4*TTI−2*OFDM symbol length. Assuming 15 kHz, 0.25 msec can be achieved by 4 OFDM symbols maximum. In that case, control/data processing cannot be accommodated due to limited budget. In case 30 kHz, TTI consists of 6 or 7 OFDM symbols. In that case, about one or maximum two OFDM symbols can be used for control/data scheduling.

In case 60 kHz, the entire subframe can be used for URLLC TDD operation if the above condition is met. If the above condition is not met, the overall latency requirement on TTI length would be reduced. However, it may anyway reduce the overall data transmission size as downlink portion is small to accommodate GP and UL portion.

In this sense, the following can be some considerations to support URLLC in FDD and TDD with different numerology.

TABLE 14

|  | 15 kHz NCP | 15 kHz ECP | 30 kHz NCP | 30 kHz ECP | 60 kHz NCP | 60 kHz ECP |
|---|---|---|---|---|---|---|
| FDD | 2 OFDM symbol | 2 OFDM symbol | 4 OFDM symbol | 4 OFDM symbol | 7 OFDM symbol | 6 OFDM symbol |
| TDD | N/A | N/A | 7 OFDM symbol | 6 OFDM symbol | 14 OFDM symbol | 12 OFDM symbol |

In case, different CP option is adopted as mentioned in the above, the recommendation can be as the follows.

TABLE 15

|  | 15 kHz CP Option 1 (13 symbol) | 30 kHz CP option 1 (13 symbol) | 60 kHz CP option 1 (13 symbol) |
|---|---|---|---|
| FDD | 2 OFDM symbol 1 symbol remained, which may be used for TTI or not used | 4 OFDM symbol 1 symbol remained, which may be used for TTI or not used | 6 or 7 OFDM symbol |
| TDD | N/A | 6 or 7 OFDM symbol | 12 or 13 OFDM symbol |

In both listed options in above, if TTI is formed within a subframe in non-overlapped manner (i.e., TTIs within a subframe would not be overlapped each other partially), there could be "remaining" OFDM symbol(s) in a subframe. For the convenient, this remaining OFDM symbol or any left samples is called "special" OFDM symbol in this invention. For example, if 16 Ts is reserved for symbol-level alignment among different numerologies, the remaining 16 Ts can be called as special OFDM symbol. For example, if 2 OFDM symbol TTI length is used with 15 kHz CP Option 1, if 6 TTIs are formed in a subframe, 1 OFDM symbol can be left.

The special OFDM symbol(s) can be used as follows (one or a few options can be used simultaneously).

One or a few TTI includes the special OFDM symbol(s) which results that one or a few TTIs can have longer TTI length compared to other TTI length.

In terms of TTI which include this additional OFDM symbol(s), it can be placed in the beginning and/or middle and/or end in a subframe (e.g., 3/2/2/2/2/2 or 2/2/2/2/2/3 or 2/2/2/3/2/2 in subframe for 15 kHz CP option (13 symbol) case, 5/4/4 or 4/5/4 or 4/4/5 in 30 kHz CP Option 1 (13 OS symbol) 7/6 or 6/7 for 60 kHz CP option 1 (13 symbol))

The same size TTIs can be placed over multiple subframes (e.g., 15*2 OS TTIs over 2 subframes for 15 kHz CP option (13 symbol) case, 13*6 OS TTIs over 6 subframes for 60 kHz CP option 1 (13 symbol))

Figure 21:
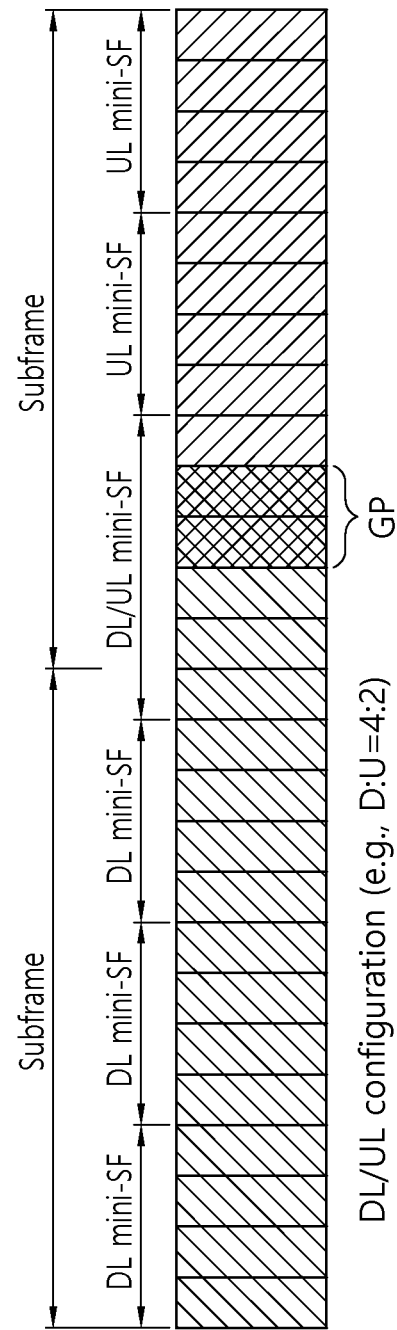
FIG. 21 shows a special subframes a located in GP portion.

Another option is to place uniform size of mini-subframes over subframe group (where subframe group size is predetermined or higher layer configured), and place special subframes in GP portion to minimize the impact from GP on mini-subframes as shown in FIG. 21.

The special symbol(s) form a TTI where this shorter TTI can be placed in the beginning and/or middle and/or end of the subframe.

The special symbol(s) is left for some purpose. The position can be in the beginning and/or middle and/or end (in case only one symbol is left), and can be placed in both beginning/end (in case two symbols are left) or where GP is needed This remaining/reserved duration can include the special symbol(s) and any "remaining" duration included in any CP+OFDM symbol within a subframe mentioned in various options if the remaining duration has not been reflected in any one or a few OFDM symbols' CP.

The special OFDM symbol can be used for (including the followings, but not limited to)

The symbol can be placed between DL and UL to accommodate DL/UL switching and timing advance (i.e., GP)

Figure 22:
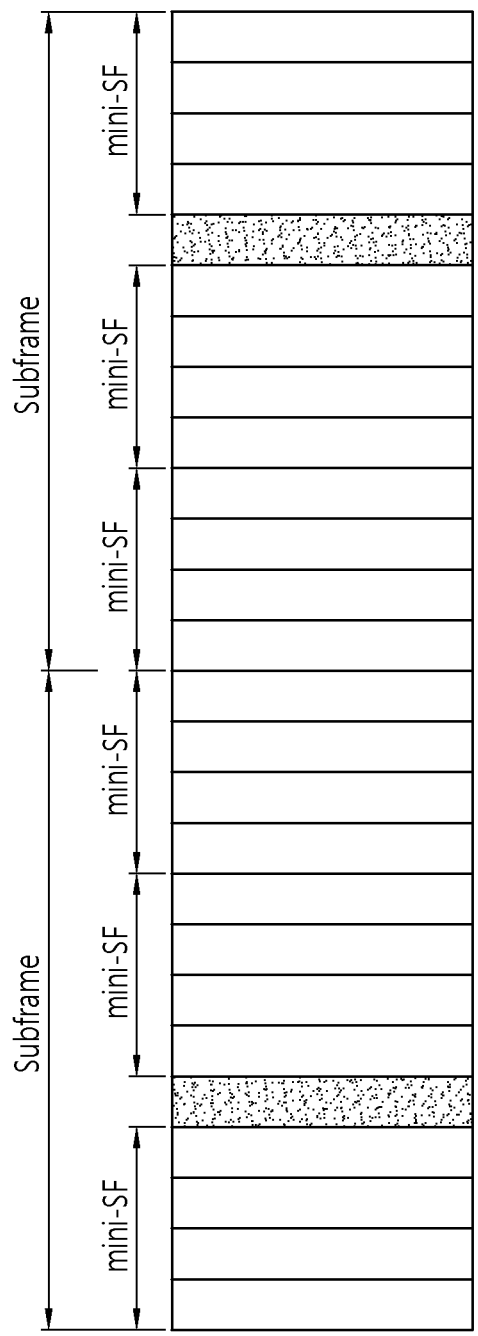
FIG. 22 shows an example of interruptions between mini-subframes.

Reserve for "further reduced latency operation" or "emergency data transmission" which can occur at least once in every subframe without affecting on-going transmission. This emergency data transmission can be also used for uplink or sidelink or relay operation. This can be used for "further" ultra low latency applications which may require less than 0.5 msec user plane latency in average or worst case user plane latency of 0.5 msec. If this is supported, the special OFDM symbol position within a subframe can change depending on the occurrence time of this ultra low latency traffic. For example, in one subframe, the position can be OFDM symbol #3 within a subframe, or in the next subframe, the position can be OFDM symbol #8. As the position can change, it would impact the on-going transmission and also may change the mini-subframe/short TTIs within a subframe as illustrated in below. Note that the interruption may occur only between mini-subframe (in other words, candidate position can be defined from one of "0, 4, 9, 12" with 4 OS TTI length with 13 OS in a subframe option as shown in FIG. 22. From a UE perspective utilizing short TTI, the starting position of short TTIs can be one of {0, 4, 8}, {1, 5, 9}, {0, 5, 9}, {0, 4, 9}. The position may be blindly detected by control channel which is assumed to be placed in the first OS of the short TTI.

Reserve for "reservation" signal which can be used by eNBs and/or UEs to reserve the channel—this could be useful in case dynamic UL/DL directions are used and inter-cell interference among neighbor cells should be dynamically addressed or unlicensed spectrum is used.

Used with different numerology—for example, in case 30 kHz is used in a subframe, the remaining OFDM symbol can be used with either 60 or 120 kHz subcarrier spacing which will allow more than one OFDM symbols to be fitted in the remaining symbol.

It can be used for control channel transmission which can include scheduling information of control channel transmitted in each mini-subframe.

For example, if two-level DCI is adopted where first DCI can include some information about min-subframe data/control scheduling and then second-level DCI can be transmitted in each mini-subframe, the special OFDM symbol(s) can be used for transmitting the first level DCI.

Figure 23:
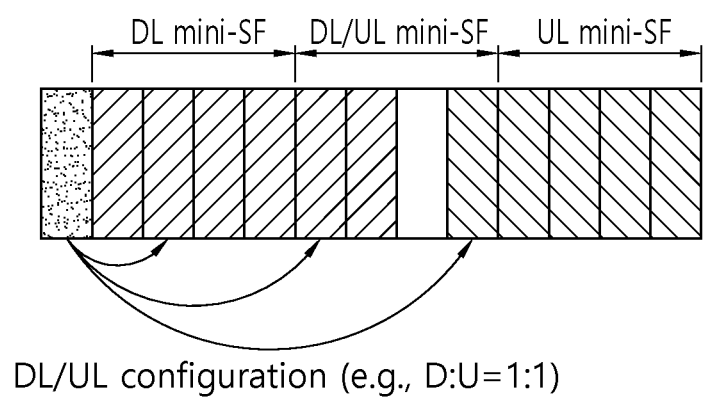
FIG. 23 shows an example of DL/UL configuration DCI over special symbol for mini-subframes or subframe group.

It can be used to signal "DL/UL configuration" or cell common signaling which can be periodically over multiple mini-subframe or in every subframe. Examples of special OFDM symbol(s) usage can be shown in FIG. 23

Figure 24:
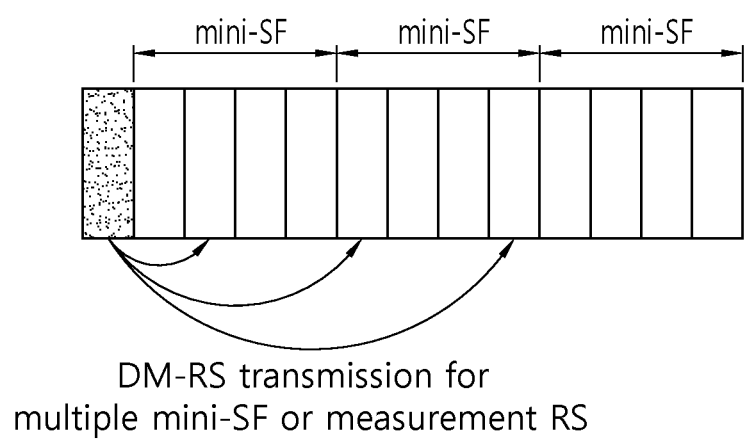
FIG. 24 shows an example of RS transmission over special OFDM symbol(s) (DM-RS or measurement RS).

It can be used for pilot signaling or DM-RS or any measurement RS. An example can be shown in FIG. 24.

It can be used for PRACH resource, particularly for URLLC UEs to provide sufficient opportunity to send PRACH transmission towards the network.

Figure 25:
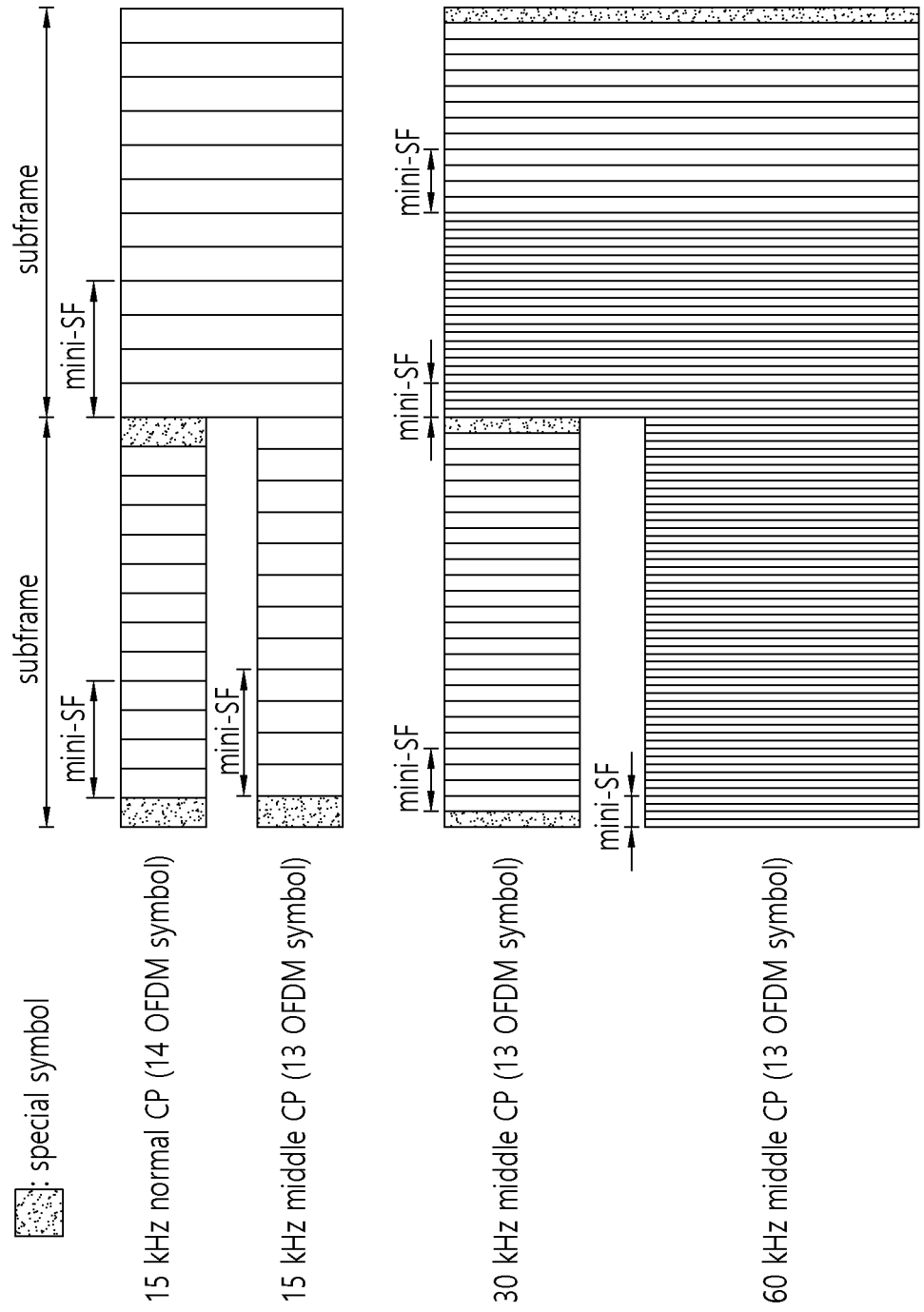
FIG. 25 illustrates an example where special subframe usage is configured differently per numerology.

As shown in FIG. 25, there are illustrated an example where special subframe usage is configured differently per numerology and the presence of special subframe may change per subframe per subband where subband location may also change over time.

It can be used for analog beam forming overhead (which can be spread over different mini-subframes).

More generally, one subframe can be divided in to "mini-subframe" which can consists of 2 or 4 or 6 OFDM symbols starting from the first OFDM symbol or second OFDMs symbol. Each mini-subframe can be used with different numerology. Also, the remaining OFDM symbol(s) can be used with different numerology.

In terms of position of remaining OFDM symbol(s), it can change over subframe depending on the use case including the usage of the remaining OFDM symbols. For example, in DL only subframe or mini-subframe, remaining OFDM symbol can be used for one or a few mini-subframe to increase TTI length, in DL/UL subframe, it can be used for GP, in UL subframe, it can be placed in the first OFDM symbol for DL→UL switching.

II. Second Disclosure

II-1. FDM Approaches

As mentioned earlier, FRG can be a frequency unit based on a numerology. We discuss how to define FRG as the follows.

FRG is defined in a multiple of resource block based on the minimum subcarrier spacing that the carrier supports.

FRG is defined in a multiple of resource block based on the maximum subcarrier spacing that the carrier supports.

FRG is defined in a multiple of resource block based on the reference subcarrier spacing that the carrier supports.

FRG is defined in a multiple of resource block based on the higher layer configured subcarrier spacing that the carrier supports.

We can call this minimum RB used to define FRG as reference resource block (RRB). In terms of FDM multiplexing among different numerologies, we can consider the following approaches.

A numerology with SCi, the possible starting location of FRG would be

Option 1: any RRB boundary: in other words, as long as it is aligned with RRB boundary, FRG of SCi can be started.

Option 2: assuming SCk is the largest subcarrier spacing that the carrier supports, FRG of SCi can start aligned with RB boundary of SCk Option 3: if the carrier also supports SCi*2, SCi can start aligned with RB boundary of SCi*2

Option 4: SCi can start aligned with RB boundary based on reference numerology which defines the subframe for the carrier Option 4: if the carrier also supports SCi/2, SCi can start aligned with RB boundary of SCi/2

Option 5: assuming SCm is the smallest subcarrier spacing that the carrier supports, FRG of SCi can start aligned with RB boundary of SCm Option 5: Along with one or more options in the above, channel raster constraints need to be also considered which may further restrict FRG region of SCi, particularly independent synchronization signals are supported.

II-2. Extended CP Handling when Symbol Level Alignment is Used

In case symbol level alignment is used where the reference subcarrier spacing is 15 kHz, it would lead different subframe duration based on a subcarrier spacing which is not 15 kHz. In this case, multiplexing with extended CP with the same subcarrier spacing needs to be further clarified.

Overall, the following approaches can be considered.

For numerology $SCi=15*2^i$ with ECP, it may be assumed that ECP and NCP with the same subcarrier spacing are aligned at 1 msec and/or 0.5 msec boundary only where 12 ECP OFDM symbols can be placed evenly over $½^i$ msec.

For the subframe length based on NCP $½^i$+delta (where delta can be positive or negative value), it can be enforced to allow subframe/slot level alignment between NCP and ECP with the same subcarrier spacing, additional CP or reduced CP on extended CP case can be considered. For example, with subcarrier spacing of 60 kHz, if the subframe duration is 250+0.51 us for one subframe and 250-0.51 us for another subframe, the first OFDM symbol of extended CP corresponding to the first subframe can have additional size of 0.51 us wand the first OFDM symbol corresponding to the second subframe can have shorter CP of 0.51 us from the first OFDM symbol. It can be also noted that any OFDM symbol or the last OFD symbol can take longer or shorter CP in ECP case to allow multiplexing. In case, two CP families are aligned at subframe/slot level, there could be reference or base numerology which is used to determine slot length/duration, and the other numerology(s) can perform puncture CP (shorten CP) or increase CP to align with slot length/duration of the reference/base numerology. One example of reference/base numerology is reference numerology or default numerology or numerology used for eMBB or used for common data transmission.

In case 0.51 us is reserved for symbol level alignment in every 0.5 msec, for extended CP case, 0.51 us can be reserved in every 0.5 msec. This will give slightly reduced subframe duration in each subframe, then, the overall CP size can be reduced for extended CP. To allow integer CP based on sampling rate, additional CP reservation can be also considerable. This additional CP can be added or some time is remained in each subframe/slot.

This similar approaches can be also considered for symbol level alignment is used based on reference subcarrier spacing, and subframe duration is equal based on reference subcarrier spacing. The alignment between a numerology with ECP with the reference subcarrier spacing can be done at subframe level of reference numerology. However, between a subcarrier spacing of SCi (which is different SC from reference numerology) ECP and NCP, the above approaches can be considered.

II-3. Subframe/Slot Length Detection

If symbol level alignment is used where SCi would have subframe length of $½^i$ (if subframe consists of 14 OS) or 0.5/2^i (if subframe consists of 7 OS)+delta (where SCi=15*2^i) where delta can be as follows
  for SCi=30 kHz, delta can be zero for subframe if subframe consists of 14 OS, delta can be 0.51 us (for the first subframe in 0.5 msec) and delta can be −0.51 us (for the second subframe) if subframe consists of 7 OS
  for SCi=60 kHz, delta can be 0.51 us for the first subframe, and −0.51 us for the second subframe if subframe consists of 14 OS, delta can be 0.51 us (for the first subframe in 0.5 msec) and delta can be −0.51/3 us (for the second, third, forth subframe) if subframe consists of 7 OS When synchronization signal is detected, depending on the position of synchronization signal, the gap between synchronization signal to follow up signals such as PBCH can be different. For example, if PBCH is transmitted in the next subframe from the synchronization signal subframe, depending on the subframe where synchronization signal(s) were transited, the gap between synchronization signal (though a UE knows the OFDM symbol index of symbol where sync signals were transmitted) and the follow-up PBCH can be a bit trickier.

As an example, if 60 kHz subcarrier spacing is used, and the subframe is defined by 14 OS, the first subframe length would be 0.25 msec+0.51 us in the first subframe in every 0.5 msec, and second subframe length would be 0.25 msec=0.51 us in second subframe in every 0.5 msec. If synchronization signals are transmitted in even subframe, and the PBCH is transmitted in the odd subframe, then, a UE needs to take 0.25 msec+0.51 us subframe duration to search the follow-up PBCH (and 0.25 msec-0.51 us if the reversely used). Thus, either a UE assumes timing offset of possibly 0.51 (or maximum 1.02 us) based on the assumption that subframe size is equal (e.g., 0.25 msec) or a UE needs to be also configured with subframe index where PSS is transmitted. Or, the location or subframe of PSS transmission is fixed for certain subframes such that a UE already knows the subframe duration of synchronization signal transmission. Alternatively, the subframe location of synchronization signals can be also indicated.

Depending on the subcarrier spacing (e.g., 240 kHz), even though subframe index is same, the subframe size can be different. Thus, the location of subframe within 0.5 msec needs to be known to know the subframe duration.

To address this issue, synchronization signal and PBCH can be transmitted in the first subframe corresponding to the first subframe in every 0.5 msec. Moreover, the issue occurs for RRM-RS based measurement as well, where the similar technique for PBCH can be applied for RRM-RS as well.

Note that 0.51 us represents the timing duration of 16 Ts based on 15 kHz subcarrier spacing with 2048 FFT size.

II-4. Alignment Between 15 kHz Based Scalable Numerology Set and 75 kHz Based Scalable Numerology Set It is possible that different numerology sets are defined, for example, one set based on 15 kHz as a base subcarrier spacing, and another set based on 75 kHz as a base subcarrier spacing. In this case, two sets may be used in different frequency band. For the numerologies of different numerology sets, if CP overhead is same (e.g., 15 kHz NCP and 75 kHz NCP), it is desirable to align two numerologies as long as subcarrier spacing of one numerology is a multiple of the other subcarrier spacing. For example, between 15 kHz and 75 kHz, symbol level alignment can be considered. However, between 30 kHz and 75 kHz or 60 kHz and 75 kHz, symbol level alignment may not be possible as one is not multiple of the other.

When two numerology sets are aligned, it is necessary to define the "base" or "reference" subcarrier spacing where symbol level alignment can be based on. To determine "base" or "reference", the following approaches can be considered.

(1) fixed as 15 kHz NCP
(2) higher layer configured
(3) fixed as 75 kHz NCP

When 15 kHz and 75 kHz NCP numerology is symbol level aligned, same principle of symbol level alignment between 15 and 60 kHz NCP can be applied. Similar mechanisms are also applicable.

If 15 kHz symbols are formed based on LTE NCP numerology, and CPs are evenly distributed to OFDM symbols, some issue with longer CP (i.e., the first OFDM symbol) may have some issue.

For example, with 15 kHz, the OFDM symbol can consist of 160 Ts, 2048 Ts, 144 Ts, 2048 Ts, 144 Ts, 2048 Ts, 144 Ts, 2048 Ts, 144 Ts, 2048 Ts, 144 Ts, 2048 Ts in every 7 OFDM symbols, the OFDM symbols of 75 kHz within 0.5 msec, the followings can be the examples.

FFT size of 75 kHz can be 2048 or 1024.
In case FFT size is 2048, the symbols of 75 kHz within 0.5 msec would be
First 5 OFDM symbols
Alt1: 160 Ts, 2048 Ts, 160 Ts, 2048 Ts, 160 Ts, 2048 Ts, 160 Ts, 2048 Ts, 160 Ts, 2048 Ts
Alt2: 16*5+144 Ts, 2048 Ts, 144 Ts, 2048 Ts, 144 Ts, 2048 Ts, 144 Ts, 2048 Ts, 144 Ts, 2048 Ts
Alt 3: 144 Ts, 2048 Ts, 144 Ts, 2048 Ts, 144,
The rest symbols
  144 Ts, 2048 Ts, 144 Ts, 2048 Ts, 144 Ts, 2048 Ts, 144 Ts, 2048 Ts, 144 Ts, 2048 Ts,
  144 Ts, 2048 Ts, 144 Ts, 2048 Ts, 144 Ts, 2048 Ts, 144 Ts, 2048 Ts, 144 Ts, 2048 Ts,
  144 Ts, 2048 Ts, 144 Ts, 2048 Ts, 144 Ts, 2048 Ts, 144 Ts, 2048 Ts, 144 Ts, 2048 Ts,
  144 Ts, 2048 Ts, 144 Ts, 2048 Ts, 144 Ts, 2048 Ts, 144 Ts, 2048 Ts, 144 Ts, 2048 Ts,
  144 Ts, 2048 Ts, 144 Ts, 2048 Ts, 144 Ts, 2048 Ts, 144 Ts, 2048 Ts, 144 Ts, 2048 Ts,
  144 Ts, 2048 Ts, 144 Ts, 2048 Ts, 144 Ts, 2048 Ts, 144 Ts, 2048 Ts, 144 Ts, 2048 Ts,
In case FFT size is 1024, the symbols of 75 kHz within 0.5 msec would be
X
In case FFT size is 512, the symbols of 75 kHz within 0.5 msec would be
  divide 2048 case by 5 in both CP and OFDM symbol length Alignment between 75 kHz ECP and 15 kHz NCP or 15 kHz ECP can be done as follows.
  Alt1: 75 kHz ECP is aligned with 15 kHz ECP by symbol level alignment
  Alt 2: 75 kHz ECP is aligned with 75 kHz NCP at a slot level, then 75 kHz and 15 kHz ECP may not be aligned. 15 kHz ECP may follow LTE 15 kHz ECP.
  Alt 3: 75 kHz ECP is aligned with 75 kHz NCP at a slot level, then 15 kHz ECP can be derived from 75 kHz based on symbol level alignment. 15 kHz ECP can be different from LTE 15 kHz ECP in this case.

The embodiments illustrated above may be implemented by various instruments. For example, the embodiments of the present invention may be implemented by hardware, firmware, software, or combinations thereof, which will be described in detail with reference to FIG. 9.

Figure 26:
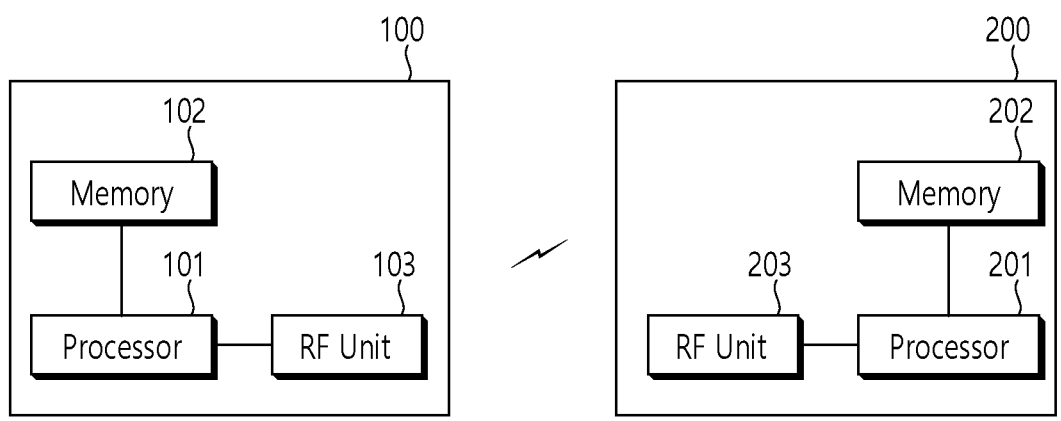
FIG. 26 is a block diagram illustrating a wireless communication system according to an embodiment of the present invention.

FIG. 26 is a block diagram illustrating a wireless communication system according to an embodiment of the present invention.

ABS 200 includes a processor 201, a memory 202, and an RF (radio frequency) unit 203. The memory 202 coupled to the processor 201 stores a variety of information for driving the processor 201. The RF unit 203 coupled to the processor 201 transmits and/or receives a radio signal. The processor 201 implements the proposed functions, procedure, and/or methods. In the aforementioned embodiment, an operation of the BS may be implemented by the processor 201.

A wireless device 100 includes a processor 101, a memory 102, and an RF unit 103. The memory 102 coupled to the processor 101 stores a variety of information for driving the processor 101. The RF unit 103 coupled to the processor 101 transmits and/or receives a radio signal. The processor 101 implements the proposed functions, procedure, and/or methods. In the aforementioned embodiment, an operation of the wireless device may be implemented by the processor 101.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The RF unit may include a base-band circuit for processing a radio signal. When the embodiment of the present invention is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

What is claimed is:

1. A method performed by a wireless device in a wireless communication system, the method comprising:
receiving, from a base station (BS), information for a subcarrier spacing among all possible subcarrier spacings, wherein the all possible subcarrier spacings comprise 15 kHz, 30 kHz, 60 kHz, 120 kHz, and 240 kHz;
identifying one or more slots related to the subcarrier spacing and a normal cyclic prefix (NCP); and
communicating with the BS via the one or more slots,
wherein the one or more slots comprise:
(i) long NCP symbols which comprise the NCP with a long NCP length; and
(ii) short NCP symbols which comprise the NCP with a short NCP length,
wherein the long NCP length is longer than the short NCP length,
wherein the long NCP symbols are spaced by 0.5 ms from each other for the all possible subcarrier spacings, and
wherein a difference between the long NCP length and the short NCP length is same for the all possible subcarrier spacings.

2. The method of claim 1, further comprising:
identifying at least one slot related to the subcarrier spacing and an extended cyclic prefix (ECP); and
communicating with the BS via the at least one slot,
wherein all symbols in the at least one slot comprise the ECP having a same length with each other.

3. The method of claim 2, wherein the one or more slots and the at least one slot are aligned at every 0.5 ms.

4. The method of claim 2, wherein the subcarrier spacing is 60 KHz.

5. A wireless device configured to operate in a wireless communication system, the wireless device comprising:
a memory;
a transceiver; and
at least one processor, operably coupled to the memory and the transceiver, configured to:
control the transceiver to receive, from a base station (BS), information for a subcarrier spacing among all possible subcarrier spacings, wherein the all possible subcarrier spacings comprise 15 kHz, 30 kHz, 60 kHz, 120 kHz, and 240 KHz;
identify one or more slots related to the subcarrier spacing and a normal cyclic prefix (NCP); and
communicate with the BS via the one or more slots,
wherein the one or more slots comprise:
(i) long NCP symbols which comprise the NCP with a long NCP length; and
(ii) short NCP symbols which comprise the NCP with a short NCP length,
wherein the long NCP length is longer than the short NCP length,
wherein the long NCP symbols are spaced by 0.5 ms from each other for the all possible subcarrier spacings, and
wherein a difference between the long NCP length and the short NCP length is same for the all possible subcarrier spacings.

6. The wireless device of claim 5, wherein the at least one processor is further configured to:
identify at least one slot related to the subcarrier spacing and an extended cyclic prefix (ECP); and
control the transceiver to communicate with the BS via the at least one slot,
wherein all symbols in the at least one slot comprise the ECP having a same length with each other.

7. The wireless device of claim 6, wherein the one or more slots and the at least one slot are aligned at every 0.5 ms.

8. The wireless device of claim 6, wherein the subcarrier spacing is 60 KHz.

9. A method performed by a base station (BS) in a wireless communication system, the method comprising:
transmitting, to a wireless device, information for a subcarrier spacing among all possible subcarrier spacings, wherein the all possible subcarrier spacings comprise 15 kHz, 30 kHz, 60 kHz, 120 kHz, and 240 kHz;
identifying one or more slots related to the subcarrier spacing and a normal cyclic prefix (NCP); and
communicating with the wireless device via the one or more slots,
wherein the one or more slots comprise:
(i) long NCP symbols which comprise the NCP with a long NCP length; and
(ii) short NCP symbols which comprise the NCP with a short NCP length,
wherein the long NCP length is longer than the short NCP length,
wherein the long NCP symbols are spaced by 0.5 ms from each other for the all possible subcarrier spacings, and wherein a difference between the long NCP length and the short NCP length is same for the all possible subcarrier spacings.

10. The method of claim 9, further comprising:

identifying at least one slot related to the subcarrier spacing and an extended cyclic prefix (ECP); and communicating with the wireless device via the at least one slot, wherein all symbols in the at least one slot comprise the ECP having a same length with each other.

11. The method of claim 10, wherein the one or more slots and the at least one slot are aligned at every 0.5 ms.

12. The method of claim 10, wherein the subcarrier spacing is 60 KHz.

* * * * *